US009037084B2

(12) United States Patent  
Tanaka

(10) Patent No.: US 9,037,084 B2  
(45) Date of Patent: May 19, 2015

(54) INFORMATION EXCHANGING APPARATUS

(75) Inventor: Masahide Tanaka, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 13/557,998

(22) Filed: Jul. 25, 2012

(65) Prior Publication Data

US 2012/0295660 A1  Nov. 22, 2012

Related U.S. Application Data

(63) Continuation of application No. 12/109,697, filed on Apr. 25, 2008, now Pat. No. 8,254,836.

(30) Foreign Application Priority Data

| Apr. 27, 2007 | (JP) | 2007-119252 |
| May 9, 2007 | (JP) | 2007-124218 |
| May 10, 2007 | (JP) | 2007-125753 |
| May 14, 2007 | (JP) | 2007-128289 |
| May 16, 2007 | (JP) | 2007-130613 |

(51) Int. Cl.
*H04B 7/00* (2006.01)
*H04M 1/725* (2006.01)

(52) U.S. Cl.
CPC ........ *H04M 1/72544* (2013.01); *H04M 1/7253* (2013.01)

(58) Field of Classification Search
CPC .................. H04M 1/7253; H04M 1/72544
USPC ................. 455/41.2, 556.1, 500; 709/232
See application file for complete search history.

(56) References Cited

U.S. PATENT DOCUMENTS

| 5,745,483 | A | 4/1998 | Nakagawa et al. |
| 6,285,747 | B1 * | 9/2001 | Haack ................... 379/102.02 |
| 6,925,288 | B2 | 8/2005 | McDonnell et al. |
| 7,444,147 | B2 | 10/2008 | Lloyd |
| 2003/0100321 | A1 | 5/2003 | Rao et al. |
| 2003/0129972 | A1 * | 7/2003 | Tosaki et al. ................. 455/414 |
| 2004/0230656 | A1 | 11/2004 | Sugawara |
| 2005/0181877 | A1 | 8/2005 | Kuwahara et al. |
| 2005/0281248 | A1 | 12/2005 | Aoki et al. |
| 2006/0234631 | A1 | 10/2006 | Dieguez |

(Continued)

FOREIGN PATENT DOCUMENTS

| CN | 1411257 A | 4/2003 |
| JP | 04-033031 | 2/1992 |

(Continued)

*Primary Examiner* — Christopher M Brandt
*Assistant Examiner* — Joseph Dean, Jr.
(74) *Attorney, Agent, or Firm* — Fish & Richardson P.C.

(57) ABSTRACT

An information exchanging apparatus capable of exchanging information with a plurality of outside apparatuses has: a first wireless communicator including a telephone transmitter and telephone receiver for wireless telephone communication with one of the outside apparatuses; a second wireless communicator other than the first wireless communicator; a transmitter arranged to transmit original information to the plurality of outside apparatuses through the second wireless communicator; a processor arranged to process response information from the plurality of outside apparatuses to be received through the second wireless communicator in response to the original information; and a distributor arranged to distribute result information from the processor to the plurality of outside apparatuses through the second wireless communicator.

12 Claims, 19 Drawing Sheets

(56) References Cited

U.S. PATENT DOCUMENTS

| | | | |
|---|---|---|---|
| 2007/0021067 A1* | 1/2007 | Kim et al. | 455/41.2 |
| 2008/0214200 A1 | 9/2008 | Grandblaise et al. | |
| 2008/0250408 A1* | 10/2008 | Tsui et al. | 718/100 |
| 2009/0007236 A1 | 1/2009 | Aoki et al. | |
| 2009/0156193 A1 | 6/2009 | Urbanija et al. | |

FOREIGN PATENT DOCUMENTS

| | | |
|---|---|---|
| JP | 05-165663 | 7/1993 |
| JP | 2001-282983 | 10/2001 |
| JP | 2002-049736 | 2/2002 |
| JP | 2002-251666 | 9/2002 |
| JP | 2003-88684 | 3/2003 |
| JP | 2003-216777 | 7/2003 |
| JP | 2003-256295 | 9/2003 |
| JP | 2004-023681 | 1/2004 |
| JP | 2004-133969 | 4/2004 |
| JP | 2004-171486 | 6/2004 |
| JP | 2005-103151 | 4/2005 |
| JP | 2005-108069 | 4/2005 |
| JP | 2005-129990 | 5/2005 |
| JP | 2005-190269 | 7/2005 |
| JP | 2005-204753 | 8/2005 |
| JP | 2005-242700 | 9/2005 |
| JP | 2007-013312 | 1/2007 |
| JP | 2007-20718 | 2/2007 |
| TW | 2007-08134 | 2/2007 |
| TW | 2007-13097 | 4/2007 |

* cited by examiner

INFORMATION EXCHANGING APPARATUS

CROSS-REFERENCE TO RELATED APPLICATIONS

This application is a continuation of U.S. Ser. No. 12/109,697, filed Apr. 25, 2008, which in turn claims the benefit of Japanese Patent Application No. 2007-119252, filed Apr. 27, 2007; Japanese Patent Application No. 2007-124218, filed May 9, 2007; Japanese Patent Application No. 2007-125753, filed May 10, 2007; Japanese Patent Application No. 2007-128289, filed May 14, 2007; and Japanese Patent Application No. 2007-130613, filed May 16, 2007, the contents of which are incorporated herein by reference.

BACKGROUND OF THE INVENTION

1. Field of the Invention

The present invention relates to an information exchanging apparatus utilizing wireless communication.

2. Description of Related Art

Cellular phones are one of typical information exchanging apparatuses utilizing wireless communication. Various proposals have been made to use cellular phones for the purposes of conducting information exchange other than voice communication. For example, JP-A-2001-282983 (hereinafter Patent Document 1) or JP-A-2002-49736 (hereinafter Patent Document 2) propose market research systems employing cellular phones. On the other hand, JP-A-2004-23681 (hereinafter Patent Document 3) proposes a virtual haiku gathering system employing cellular phones.

Inconveniently, however, with conventional information exchanging apparatuses, because of charges for the use of cellular phone networks, such functions have not yet become common as functions that can be easily used like those, such as games, executed within cellular phones themselves.

SUMMARY OF THE INVENTION

In view of the above, it is an object of the present invention to provide an information exchanging apparatus that permits easier information exchange; another object of the invention is to provide an information exchanging apparatus that permits easy coordination among a comparatively large number of people.

To achieve the above object, according to the invention, an information exchanging apparatus capable of exchanging information with a plurality of outside apparatuses is provided with: a first wireless communicator including a telephone transmitter and telephone receiver for wireless telephone communication with one of the outside apparatuses; a second wireless communicator other than the first wireless communicator; a transmitter arranged to transmit original information to the plurality of outside apparatuses through the second wireless communicator; a processor arranged to process response information from the plurality of outside apparatuses be received through the second wireless communicator in response to the original information; and a distributor arranged to distribute result information from the processor to the plurality of outside apparatuses through the second wireless communicator.

Other features, elements, steps, advantages and characteristics of the present invention will become more apparent from the following detailed description of preferred embodiments thereof with reference to the attached drawings.

DETAILED DESCRIPTION OF PREFERRED EMBODIMENTS

Figure 1:
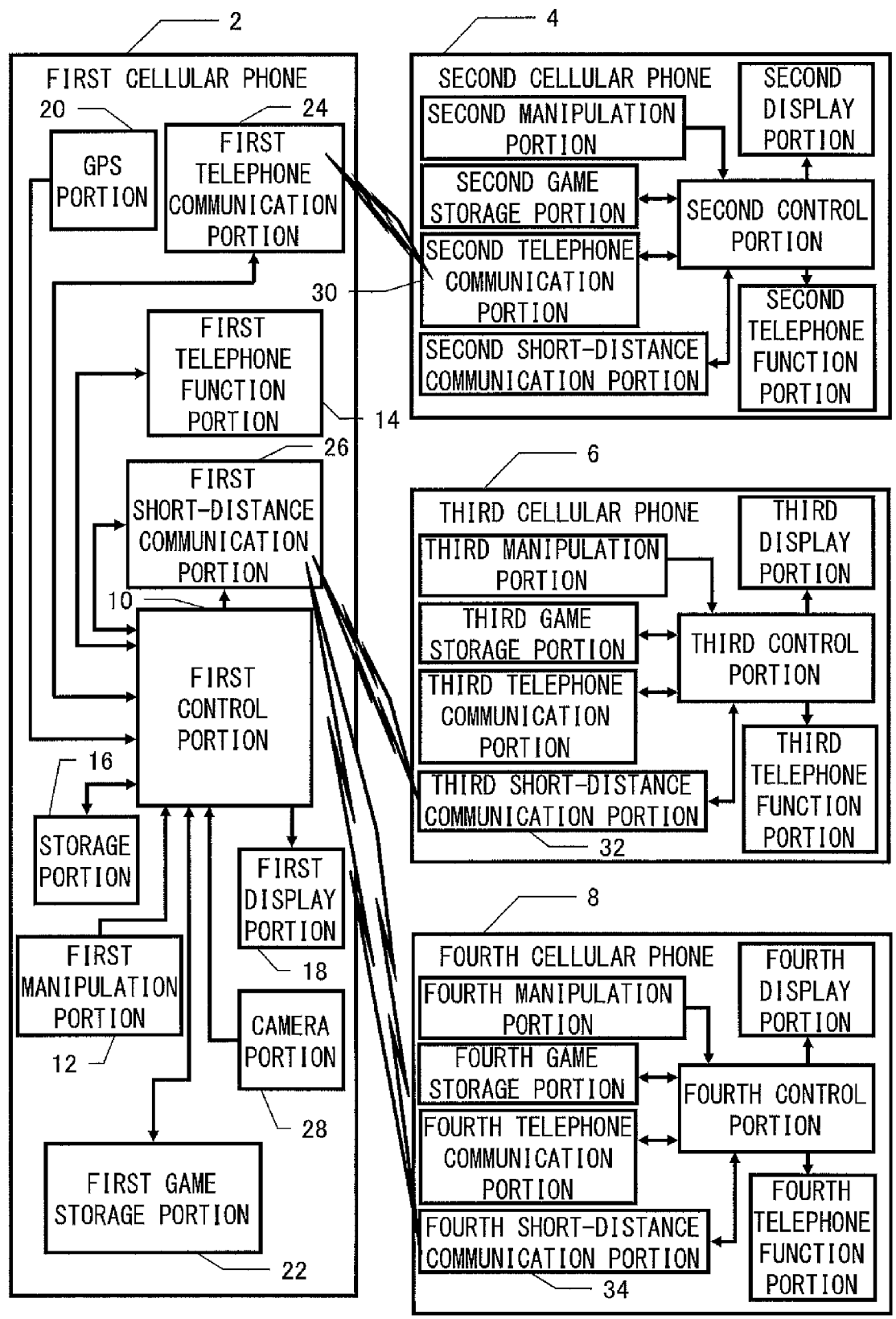
FIG. 1 is a block diagram showing, as a first embodiment, a game system embodying the invention.

FIG. 1 is a block diagram showing, as a first embodiment, a game system embodying the invention. This embodiment is built as a cellular phone-based system, which includes a first cellular phone 2, a second cellular phone 4, a third cellular phone 6, and a fourth cellular phone 8. These are basically similarly configured. Although only four cellular phones are shown in FIG. 1, this is for the sake of simplicity: this embodiment is built as a system presupposing a large number of cellular phones, and assumes a system involving about 100 similarly configured cellular phones located within a short-distance communication range.

The first cellular phone 2 has a first control portion 10 comprising a computer controlling the entire cellular phone, and, according to how a first manipulation portion 12 is operated, the first control portion 10 controls a first telephone function portion 14 etc. The functions of the first control portion 10 are executed by software stored in a storage portion 16. The storage portion 16 also temporarily stores various kinds of data needed to control the entire first cellular phone 2. The first control portion 10 also controls a first display portion 18 to provide GUI (graphical user interface) display coordinated with how the first manipulation portion 12 is operated, and to display control results.

Utilizing a GPS (global positioning system) system, a GPS portion 20 acquires, as absolute position information of the first cellular phone 2, latitude-longitude-altitude information from a satellite or a nearby broadcast station, and feeds it to the first control portion 10. Under the control of the first control portion 10, the absolute position information is, along with a map, displayed on the first display portion 18, and is thereby presented as navigation information.

A first game storage portion 22 stores data related to games executable on the first cellular phone 2. The data related to these games are standardized, and the data of different games are uniquely identifiable by their IDs. As will be described in detail later, the games stored in the first game storage portion 22 include not only ones that are enjoyed on the first cellular phone 2 alone but also ones that are enjoyed in coordination with many other cellular phones such as the second cellular phone 4. Incidentally, the first game storage portion 22 stores not only data related to games for amusement but also, as will be described in detail later, data for conducting public opinion surveys, information exchanges, etc. In the following description, games as well as activities like public opinion surveys and information exchanges are collectively dealt with as "games"; wherever necessary, they will be discussed separately in the categories of "games", "public opinion surveys", "information exchanges", etc. in their narrow senses. Accordingly, unless otherwise stated, the term "games" used in its broad sense is to be understood to cover not only "games" in its narrow sense but also "public opinion surveys", "information exchanges", etc, and any description related to "games" is to be understood to apply equally to all the categories.

By the operation of the first telephone function portion 14 and a first telephone communication portion 24, the first cellular phone 2 can conduct wireless communication including ordinary voice communication across a telephone network. Also provided with a first short-distance communication portion 26 utilizing a wireless LAN (local area network) or the like, the first cellular phone 2 can conduct wireless communication with another cellular phone or the like located within a short-distance communication range.

The first short-distance communication portion 26 complies with a standard exempt from regulation by law; it operates only within a limited communication range but does not incur charges as across a telephone network.

The first short-distance communication portion 26 can exchange data for games that will be described later; in addition, the first short-distance communication portion 26 can transmit absolute position information acquired by the GPS portion 20 to another cellular phone, and can receive absolute position information acquired by the GPS portion of another cellular phone. Thus, on the first display portion 18, not only the owner's position but also the position of the person carrying another cellular phone can be displayed on a single map, permitting confirmation of the two persons' positions relative to each other. This is discussed in detail in, for example, Japanese Patent Application filed as No. 2007-28393.

The first cellular phone 2 further has a camera portion 28; images shot with it can be stored in the storage portion 16, or transmitted to another cellular phone by the operation of the first telephone communication portion 24.

As already mentioned, the second cellular phone 4, the third cellular phone 6, and the fourth cellular phone 8 are configured similarly to the first cellular phone 2. Accordingly, no more reference signs than are necessary are shown in FIG. 1, and no overlapping explanations will be repeated unless necessary. Moreover, in FIG. 1, the GPS portions, the storage portions, and the camera portions of the second cellular phone 4, the third cellular phone 6, and the fourth cellular phone 8 are omitted from illustration.

Next, the coordination between the first cellular phone 2 and another cellular phone will be described. Although the description centers around the first cellular phone, any other cellular phone such as the second cellular phone 4 may instead assume a functionally central role in a similar manner.

In FIG. 1, the first cellular phone 2 is conducting ordinary telephone communication with, for example, the second cellular phone 4, with the first telephone communication portion 24 conducting wireless communication with a second telephone communication portion 30. Although these are shown as if communicating directly with each other in FIG. 1, in reality, since, as is well known, cellular phones conduct infrastructure communication across a communications network, the first telephone communication portion 24 and the second telephone communication portion 30 communicate with each other across a telephone network via base stations.

On the other hand, in FIG. 1, the first cellular phone 2 is conducting ad hoc communication with, for example, the third cellular phone 6 and the fourth cellular phone 8, with the first short-distance communication portion 26 communicating directly with a third short-distance communication portion 32, and the first short-distance communication portion 26 communicating also directly with a fourth short-distance communication portion 34. As already mentioned, the first short-distance communication portion 26 can communicate directly with the short-distance communication portion of yet another cellular phone and so forth, and can transmit identical information to, for example, a large number of cellular phones located within the short-distance communication range of the first cellular phone 2. In terms of reception, the first short-distance communication portion 26 can receive information from different cellular phones individually on a first-access-first-served basis or by time zone allocation.

Naturally, by originating a phone call to the third cellular phone 6 or the fourth cellular phone 8, the first telephone communication portion 24 of the first cellular phone 2 can connect with a third or fourth telephone communication portion for wireless telephony. On the other hand, while conducting transmission to the short-distance communication portions of the third cellular phone 6 and the fourth cellular phone 8, the first short-distance communication portion 26 can simultaneously transmit information to a second short-distance communication portion of the second cellular phone 4, and also receive information from the second short-distance communication portion individually.

The foregoing has discussed the relationship of one cellular phone with other cellular phones, taking up the functions of the first cellular phone 2 as an example; needless to say, any one of the second cellular phone 4, the third cellular phone 6, and the fourth cellular phone 8 can function similarly.

Functioning as described above, the first cellular phone 2, the second cellular phone 4, the third cellular phone 6, and the fourth cellular phone 8 can conduct ordinary telephone communication between any two of them by the operation of their telephone communication portions, and can enjoy, by the function of their short-distance communication portions, a group game through coordination of a large number of cellular phones; they can even conduct a public opinion survey or the like through coordination of a large number of cellular phones.

Figure 2:
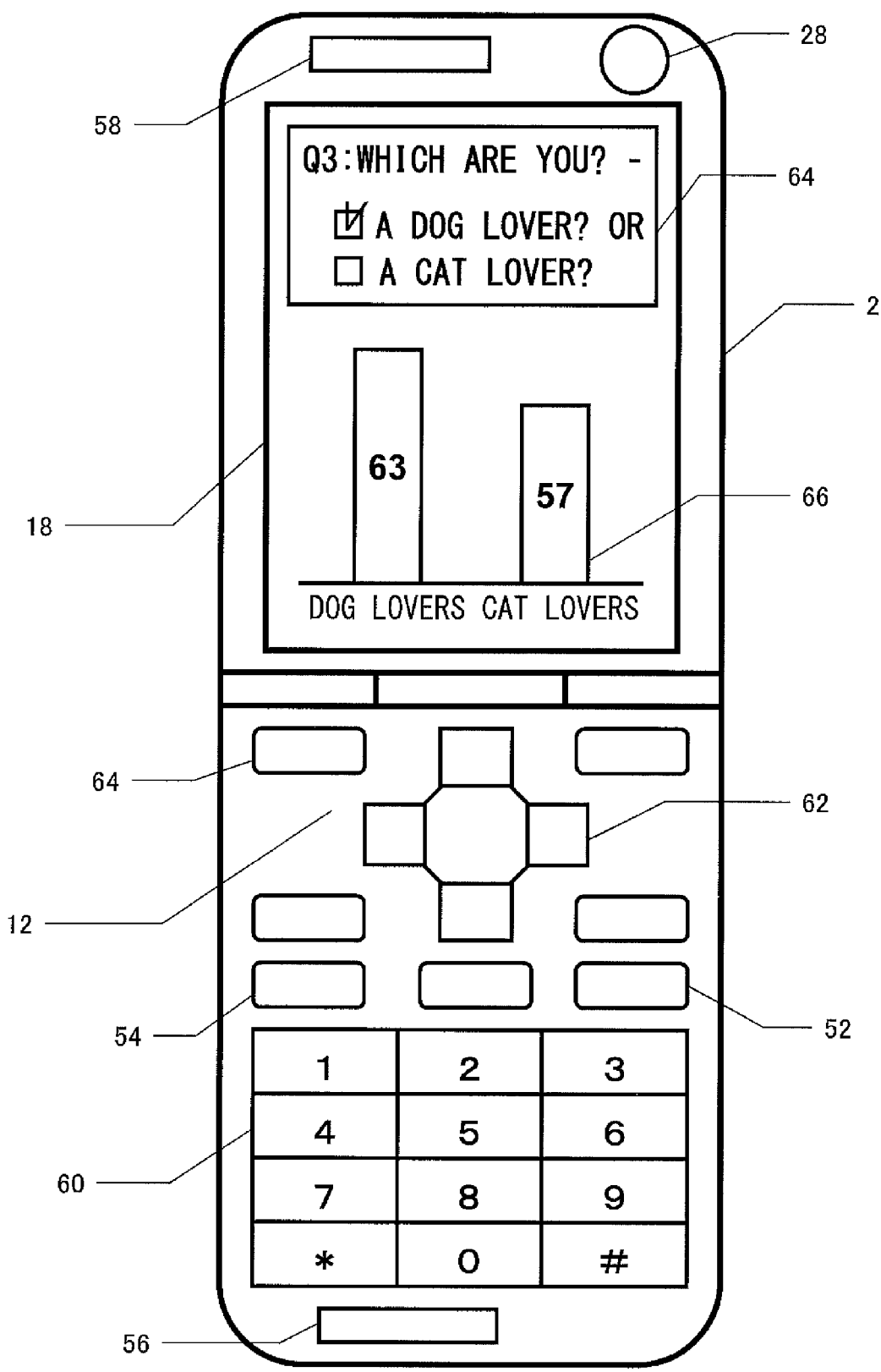
FIG. 2 is an exterior front view of the first cellular phone, designed as a foldable type, in its unfolded state.

FIG. 2 is an exterior front view of the first cellular phone 2, designed as a foldable type, in its unfolded state. FIG. 2 shows an outline of its construction along with an example of the game displayed on the first display portion 18, which comprises an LCD (liquid crystal display). The first cellular phone 2 can conduct ordinary telephone communication by the operation of a power key 52, a talk key 54, a microphone 56, and an earphone (speaker) 58; it also permits video telephony with the owner's face shot with the camera portion 28.

The first manipulation portion 12 achieves a GUI by permitting the owner to make operations on what is displayed on the first display portion 18 mainly with numerical keys 60 and cross-shaped keys 62. A menu key 64 is operated to call menus for the GUI.

In FIG. 2, on the first display portion 18, a questionnaire game is shown that is being conducted through coordination of the cellular phones of, for example, 100 people. In the query area 64, the query "Are you a dog lover, or a cat lover?" is being displayed as the third among a series of queries. In response to the query, the owner of the first cellular phone 2 has checked the check box for "dog lover" by operating the first manipulation portion 12. Such a query can be transmitted from any of the 100 cellular phones participating in the game to any other by the operation of their short-distance communication portions; the description here, however, proceeds on the assumption that the first cellular phone 2 has transmitted it. In the following description, the action of someone transmitting a game from the short-distance communication portion of his cellular phone to another cellular phone in this way will be referred to as "proposal" of the game, and the action of someone participating in the game in response will be referred to as "participation" in the game; the one who has transmitted the game will be refereed to as its "proponent". Furthermore, in what follows, a game that presupposes participation of a large number of people as described above will be referred to as a "100-people game" representatively.

In response to the proposal from the first cellular phone 2, the participants individually transmit their answers, by the operation of their respective short-distance communication portions, to the first cellular phone 2. In the summary area 66 on the first display portion 18, the summary of the answers from all the participants is being displayed. Information on the summary result is transmitted to every participant. Accordingly, each participant can display, on the display portion of his cellular phone, the same information as that being displayed on the first display portion 18.

Incidentally, the mode of how data is displayed in the summary area 66 can be switched between a "real-time display" mode and a "conditional display" mode. In the "real-time display" mode, the answers collected progressively from the participants are summarized constantly on a real-time basis at one in-progress stage after another so as to be transmitted to each participant on a real-time basis. This keeps each participant informed of the trend of other participants, in light of which he can decide his answer. This is suitable, for example, in cases of popularity voting.

On the other hand, in the "conditional display" mode, when a certain condition is fulfilled (for example, when the number of answers collected has reached half the total number of participants, or when, for example, one of the numbers of "cat lovers" and "dog lovers" has exceeded one-half of the other, or every time a predetermined length of time passes), summarizing is performed and the result is transmitted; that is, unless a certain condition is fulfilled, no in-progress reports are offered. This is suitable, for example, in cases where a participant prefers to decide his answer in light of the trend of other participants as guessed from limited information. In a case where the "conditional display" mode is chosen, the summary chart of "dog lovers" and "cat lovers" in the summary area 66 is not updated unless a certain condition is fulfilled, and instead the display made when the condition was fulfilled previously is retained as it is. Alternatively, in a case where the "conditional display" mode is chosen, the summary chart of "dog lovers" and "cat lovers" in the summary area 66 is only displayed for a predetermined length of time when a certain condition is fulfilled, and for the rest of time only the number of answers collected is displayed.

Which of these display modes to choose matters little in a case where queries dealt with are simply for a questionnaire; however, in a case of a game adopting tournament-type rules in which whoever turns out to have voted for the minority in the final summary of one query wins and is entitled to proceed to the next, it adds to the pleasure of the game to be permitted a choice of whether to monitor the trend of other participants on a real-time basis or guess it in light of information offered at turning points. If the rules are additionally such that a participant is permitted to change his answer as many times as he likes at any time before a deadline, which display mode to choose greatly affects the pleasure of the game.

For example, when "cat lovers" are the minority in an interim summary, if a participant wants to win the game, he has only to switch from a "dog lover" to a "cat lover"; however, since other participants think the same way, in the next summary, "cat lovers" may turn out to be the majority. Guessing the trend of other participants in this way resembles predicting stock prices, and the pleasure of the game greatly varies depending on whether one is permitted to monitor the trend of other participants on a real-time basis or is obliged to guess it in light of in-progress reports offered at turning points.

As something intermediary between the above two modes, the "real-time display" mode may be so modified that the summary is displayed with a predetermined delay, so that the game is so adapted that information is offered with intentional delay.

Incidentally, one can not only participate in a game as a player sending his answer but also "participate as a monitor" simply monitoring the summary as a bystander. In that case, depending on the degree of pleasure the monitor likes to have, he can freely switch between the "real-time display" mode and the "conditional display" mode. On the other hand, if one "participates as a player", which mode to adopt is unified among all players so that they play under the same conditions, because the degree to which each is permitted to grasp the trend of others affects whether they change or do not change their answers.

Figure 3:
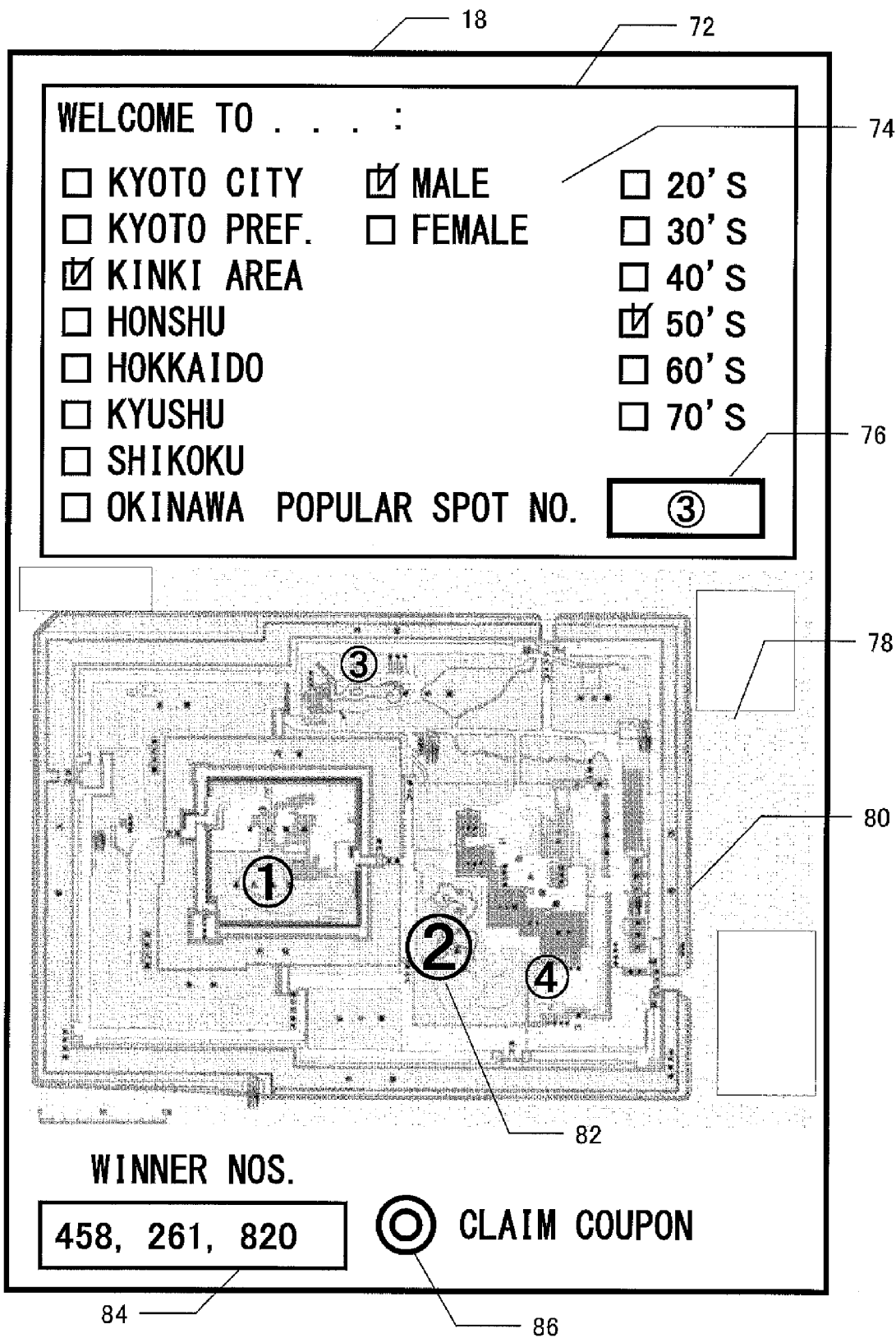
FIG. 3 is a diagram showing a screen displayed in a game according to a second embodiment of the invention.

FIG. 3 shows another example of the game displayed on the first display portion 18, in a second embodiment of the invention (for the sake of discussion, this type of game will be referred to tentatively as a "locality game"). In the second embodiment, one of the cellular phones shown in FIG. 1 (for example, the fourth cellular phone 8) is installed stationarily in a sightseeing area or the like. In the second embodiment so configured, the main functions of the fourth cellular phone 8 are to propose exchanges of information on the sightseeing area to every visitor who has entered the short-distance communication range, to receive information from any participant among all visitors, and to present summary data etc.

The fourth cellular phone 8 may be manually operated by an administrator in the locality, and can be automated to propose information exchanges automatically and constantly and to automatically conduct information exchanges with participants. In that case, the fourth manipulation portion, the fourth display portion, the camera portion, etc., which would be provided in an ordinary cellular phone, may be omitted; the exterior shape does not need to be that of an ordinary cellular phone. The stationary installation also permits omission of the GPS portion etc.

FIG. 3 shows an example of what is displayed on the first display portion 18 in the second embodiment configured as described above when the owner of the first cellular phone 2 visits the locality. In the query area 72, a visitor property input column 74 is provided. If sure that there is no privacy risk, the visitor, by operating the cross-shaped keys 62 etc., checks, in the visitor property input column 74, one of the check boxes for different residence zones, one of the check boxes for different sexes, and one of the check boxes for different age groups. The data of these visitor properties is made use of mainly in the management of the sightseeing area. In the query area 72, a popular spot voting column 76 is also provided, where the visitor, by operating the numerical keys 60 etc., inputs, out of sightseeing spot numbers assigned on a map of the sightseeing area, the one assigned to the sightseeing spot that the visitor has most liked.

In an information presentation area 78 on the first display portion 18, a map 80 of the sightseeing area is displayed, and different numbers 82 are assigned to different sightseeing spots on the map 80. The above-mentioned input of a number in the popular spot voting column 76 is done based on either the map 80 or the sightseeing spot numbers 82. In the example shown in FIG. 3, out of the sightseeing spot numbers "1" to "4", "3" is selected and is inputted in the popular spot voting column 76.

The popular spot numbers transmitted from participants are summarized in the fourth cellular phone 8, and the result is indicated by showing the numbers 82 of different popular spots in different sizes according to the numbers of votes they have gained. In the example shown in FIG. 3, the popular spot numbered "2" has gained the largest number of votes, and thus its number is shown in the largest size; the popular spot numbered "3" has gained the smallest number of votes, and thus its number is shown in the smallest size.

In the information presentation area 78, prize winner numbers 84 are also shown to indicate the result of a lottery conducted with the lowest three digits of participant numbers, which are issued to participants, according to their IP addresses, who have cooperated by inputting information in the query area. A participant with his participant number matching with any of the prize winner numbers 84 can, by operating a coupon claiming button 86, obtain an electronic coupon that can be used in the sightseeing area.

Although not illustrated in FIG. 3, a participant can, if interested, receive the summary result of the visitor property data inputted in the query area 72. The second embodiment described above deals with a simple example that involves, as game contents, presentation of sightseeing information etc. with the aim of collecting information needed for locality administration and asking for visitors' cooperation in it. Contents may be so devised as to offer more game-like contents such as locality quizzes and matches between people from different hometowns.

Figure 4:
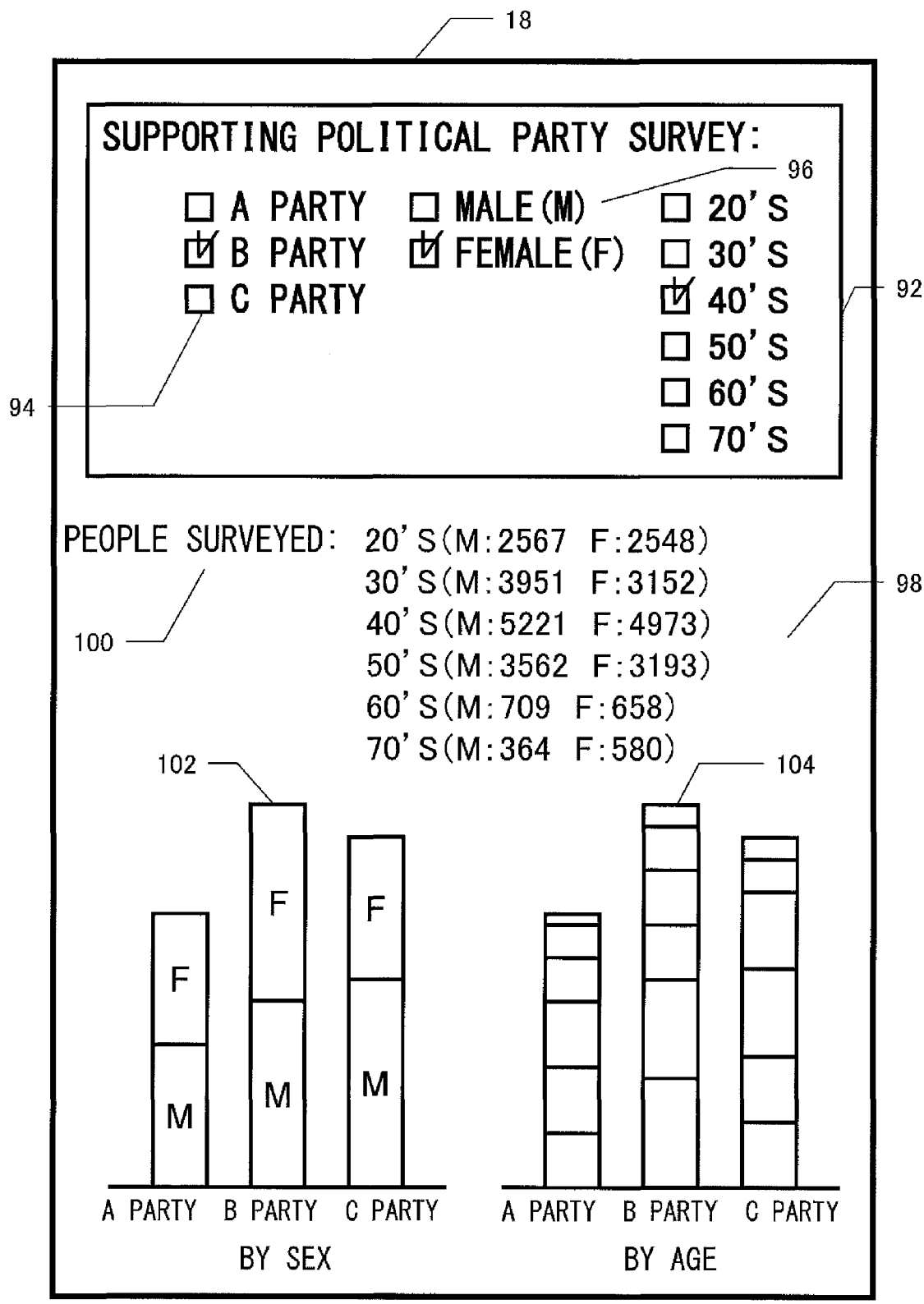
FIG. 4 is a diagram showing a screen displayed in a game according to a third embodiment of the invention.

FIG. 4 shows yet another example of the game displayed on the first display portion 18, in a third embodiment of the invention. In the first and second embodiments, only cellular phones located within the communication range of their short-distance communication portions are involved; by contrast, in the third embodiment, a wide-area server is additionally involved. This permits the rules of communication among short-distance communication portions to be controlled in a unified manner, and permits their summary results to be gathered together over the Internet by the operation of telephone communication portions so as to be summarized on a larger scale. This makes it possible to conduct a wide-area survey beyond the short-distance communication range (for the sake of discussion, a game involving a wide-area server like this will be referred to tentatively as a "wide-area game").

FIG. 4 shows an example of an on-the-street sampling survey on people's supporting political parties conducted with the third embodiment configured as described above. In the third embodiment, for example, the first cellular phone 2 is under the control of a wide-area server, and serves as a proponent by transmitting a proposal for a wide-area survey within the short-distance communication range. Specifically, the owner of the first cellular phone 2 is a correspondent for a supporting political party survey, who goes to, for example, a park or a railway station to conduct an on-the-street survey and "proposes a game" by asking people around him to cooperate in the on-the-street survey.

FIG. 4 shows the display made on the first display portion 18 of the first cellular phone 2 serving as the proponent; the same display is made on the cellular phone of each participant, such as the second cellular phone 4. In a query area 92 on the display portion, supporting political party check boxes 94 and a survey participant property input column 96 are provided. A survey participant, by operating the cross-shaped keys 62 etc., checks one of the supporting political party check boxes 94 and, if sure that there is no privacy risk, also checks, in the survey participant property input column 96, one of the check boxes for different sexes and one of the check boxes for different age groups.

The data inputted by participants is transmitted to the first short-distance communication portion 26 of the first cellular phone 2, is then summarized in the first control portion 10, and is then transmitted from the first telephone function portion 14 to the wide-area server. The wide-area server organizes a plurality of correspondents, and receives from them, who are acting on the street at different sites, similar short-distance range summary results across a cellular phone network. The sites to which correspondents are dispatched may be limited to within a given city or prefecture; alternatively, a sampling survey may be entrusted to correspondents scattered across a country. Such correspondents are not limited to those in regular employment with the administrator of the wide-area server, but may be hired at relevant sites whenever a survey is conducted.

The wide-area server summarizes the data from different correspondents to create wide-area statistic data. This wide-area statistic data is analyzed by the wide-area server itself, and is distributed back to the correspondents across a cellular phone network. Receiving the wide-area statistic data, the correspondents transfer it to the participants nearby by the operation of short-distance communication portions. In this way, not only correspondents but also all participants can share wide-area statistic data and know the result of the survey in which they have participated.

In FIG. 4, in a wide-area statistic data column 98 in the first display portion 18, the participants of the wide-area survey are classified by age and by sex, and are indicated as people surveyed 100. Also shown is the statistic result in the form of a supporting political party distribution chart by sex 102 and a supporting political party distribution chart by age 104.

As described above, according to the features of the invention, in a survey of supporting political parties or of the Cabinet approval rate, it is possible to conduct a sampling survey more efficiently than by a house-to-house survey by telephone. Moreover, by appropriately selecting and arranging short-distance communication ranges, it is possible to conduct a flexible and highly reliable public opinion survey. Even in such wide-area applications, contents may be so devised as to offer more game-like programs beyond simple surveys.

Figure 5:
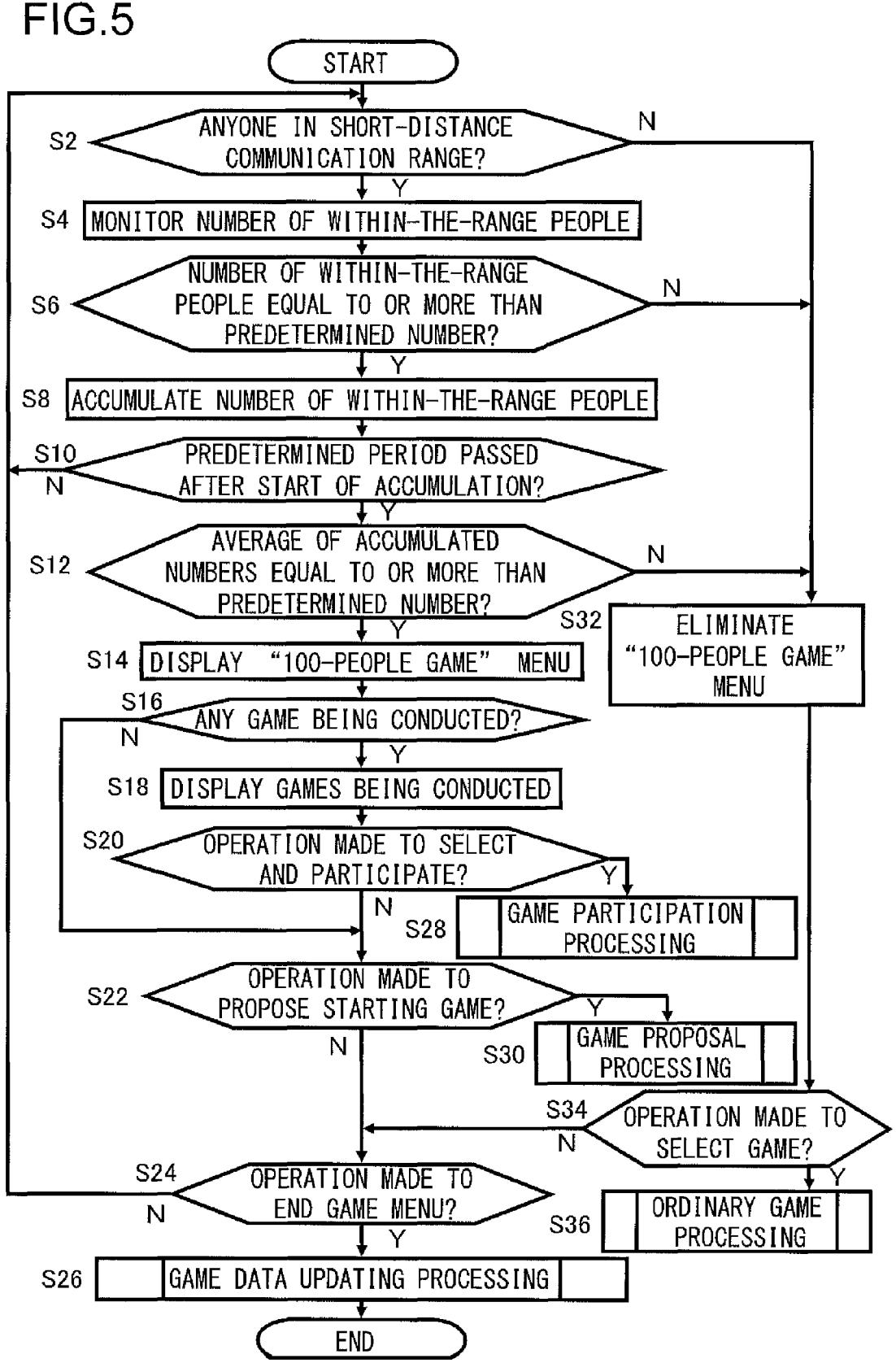
FIG. 5 is a flow chart showing the operation of the first controller 10 for starting a game.

FIG. 5 and the following figures are flow charts showing the operation of the first control portion 10 in the first cellular phone 2 in FIG. 1; these figures are common to the other cellular phones such as the second cellular phone 4. Although FIG. 5 and the following figures apply to any of the first to third embodiments described above, the following description basically centers around the first embodiment, giving explanations of functions of the second and third embodiments whenever necessary.

FIG. 5 shows a game menu flow for starting a game. The flow starts, for example, on operation of the menu key 64 shown in FIG. 2. When the flow starts, first, in step S2, it is checked whether or not there is a person carrying another cellular phone within the short-distance communication range. If there is anyone carrying another cellular phone within the short-distance communication range, the flow proceeds to step S4, where all the people within the short-distance range who can be monitored are monitored. The monitoring here is a process in which an information exchange is attempted for a predetermined period with the cellular phone of each person within the communication range individually according to a predetermined traffic control process such as one operating on a first-access-first-served basis.

When the monitoring period in step S4 has passed, the flow proceeds to step S6, where it is checked whether or not the number of within-the-range people detected is equal to or more than a predetermined number (for example, 50). If the number of people within the range is equal to or more than the predetermined number, the flow proceeds to step S8, where the number of within-the-range people detected is accumulated, and then the flow proceeds to step S10. In step S10, it is checked whether or not a predetermined period has passed since the number of within-the-range people started to be accumulated so that, if not, the flow returns to step S2. Thereafter, steps S2 through S10 are repeated until the predetermined period passes unless either, in step S2, no person is detected any longer within the short-distance range or, in step S6, the number of within-the-range people is no longer equal to or more than the predetermined number. Meanwhile, every time step S8 is reached, the number of within-the-range people is accumulated.

When, in step S10, it is detected that the predetermined period has passed, the flow proceeds to step S12, where it is checked whether or not the average of the accumulated numbers of within-the-range people is equal to or more than a predetermined number. If the average is equal to or more than the predetermined number, it follows that the number of within-the-range people located nearby is stable. Thus, assuming that it is now possible to conduct a game or survey presupposing a large number of people, the flow proceeds to step S14, where a menu of games categorized as "100-people games" is displayed. This display may be added to, so as to be mixed with, a menu of ordinary games, or may be made independently as a menu of those categorized as "100-people games".

Next, in step S16, it is checked whether or not there is a "100-people game" currently being conducted, and, if there is any, the flow proceeds to step S18, where a table of the "100-people games" currently being conducted is displayed. This display is made, specifically, by changing the color of or putting a mark to, among the games listed in step S14, those currently being conducted. A game with the changed color or the mark thus indicates that someone nearby has already proposed it and participation into it is possible. When this menu is displayed, it is now possible to make an operation to specify a game and participate in it. Then, in step S20, it is checked whether or not such an operation is made.

If no operation for selecting and participating in a game as mentioned above is detected to be made within a predetermined period, the flow proceeds to step S22. On the other hand, if, in step S16, no "100-people game" is detected to be currently being conducted, the flow proceeds directly to step S22. In step S22, it is checked whether or not an operation is made to propose, from the menu of "100-people games" displayed in step S14, a game that is not currently being proposed. If no such operation is detected, the flow proceeds to step S24, where it is checked whether or not an operation is made to end the display of the game menu.

If, in step S24, no operation to end the display of the game menu is detected, the flow returns to step S2 and thereafter, unless a predetermined condition is fulfilled, steps S2 through S24 are repeated. Here, the predetermined condition is any of the following conditions: in step S2, no person is detected within the communication range; in step S6, the number of within-the-range people is detected to be less than the predetermined number; in step S12, the average of the accumulated numbers of within-the-range people is detected to be less than the predetermined number; in step S20, an operation to select and participate in a game currently being conducted is detected; in step S22, an operation to propose starting a game is detected; and, in step S24, an operation to end the game menu is detected.

On the other hand, if, in step S24, an operation to end the game menu is detected, the flow proceeds to step S26, where processing for game data updating is executed, and then the flow ends. The details of the processing for game data updating in step S26 will be described later.

If, in step S20, an operation to select and participate in a game currently being conducted is detected, the flow proceeds to step S28 to proceed to processing for game participation. The details of the processing for game participation in step S28 will be described later.

If, in step S22, an operation to propose starting a game is detected, the flow proceeds to step S30 to proceed to processing for game proposal. The details of the processing for game proposal in step S30 will be described later.

If, in step S2, no person is detected within the short-distance range, or, in step S6, the number of within-the-range people is detected to be less than the predetermined number, or, in step S12, the average of the accumulated numbers of within-the-range people is detected to be less than the predetermined number, then the flow proceeds to step S32, where the "100-people game" menu is eliminated from the display of the game menu. This makes it impossible to select a "100-people game", and thereby prevents confusion on the user's part that may arise as a result of a menu of unexecutable games being displayed.

Next, in step S34, it is checked whether or not an operation is made to select one of the ordinary games displayed in step S32. If such an operation is detected, the flow proceeds to processing for an ordinary game in step S36. In this processing for an ordinary game, an ordinary game is conducted as it is conventionally done.

On the other hand, if, in step S34, no operation to select a game is detected, the flow proceeds to step S24, and, if no operation to end the game menu is detected, the flow returns to step S2. In this case, if, in step S2, no person is detected within the short-distance range, or, in step S6, the number of within-the-range people is detected to be less than the predetermined number, or, in step S12, the average of the accumulated numbers of within-the-range people is detected to be less than the predetermined number, then the flow returns to step S32, and thereafter, via one of these steps, steps S32 through S34 are repeated.

Permitting the flow to proceed from step S34 to step S24 as described above makes it possible, when the flow has returned to step S2 and a person in the short-distance range is detected, for the flow to proceed to step S14 to enter the loop for the display of the "100-people game" menu.

As described above, in the flow shown in FIG. 5, according to how conditions change as the loop is repeated, the display of the "100-people game" menu is automatically switched by being either displayed in step S14 or eliminated in step S32.

Incidentally, in the case of a "locality game" in the second embodiment shown in FIG. 3, the cellular phone installed stationarily in the locality (hereinafter referred to as the "locality-installed stationary cellular phone") is automatically and constantly transmitting the proposal for the locality game irrespective of whether or not there are people in the short-distance communication range or their number. To cope with this, the flow is modified such that, when a person detected in the short-distance communication range in step S2 is identified as the locality-installed stationary cellular phone, the flow proceeds directly to step S18. In this way, when a person enters the range in which short-distance communication with the locality-installed stationary cellular phone is possible, even if he is the only one there, it is displayed that a locality game is being conducted, and the person can participate in it.

Figure 6:
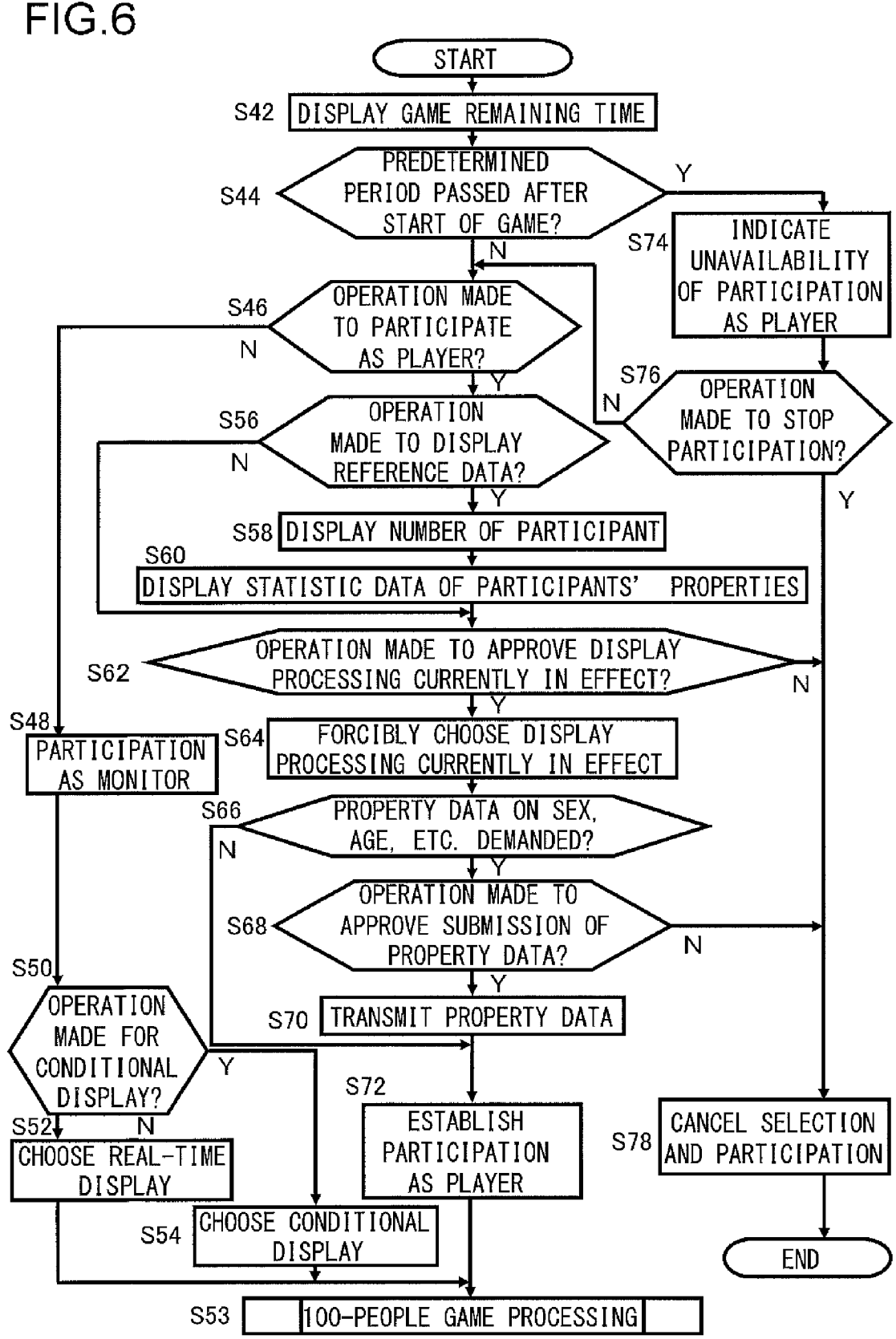
FIG. 6 is a flow chart showing the details of the processing for game participation in step S28 in FIG. 5.

FIG. 6 is a flow chart showing the details of the processing for game participation in step S28 in FIG. 5. When the flow starts, first, in step S42, the remaining time of the game is displayed. This lets the would-be participant of the game know its progress.

Next, in step S44, it is checked whether or not a predetermined period has passed since the game was started. If the predetermined period has not passed yet, the flow proceeds to step S46, where it is checked whether or not an operation to participate as a player is made within a predetermined period. If no such operation is detected within the predetermined period, the flow proceeds to step S48, where participation in the game as a monitor is established.

Next, in step S50, it is checked whether or not an operation to select "conditional display" is made within a predetermined period. If no such operation is detected within the predetermined period, the flow proceeds to step S52, where the "real-time display" mode is established, and then the flow proceeds to processing for a 100-people game in step S53. The details of the processing for a 100-people game will be described later. In this way, if, after step S46 is reached, no operation is made within a predetermined period, the flow automatically proceeds to step S52, where "participation as a monitor" in the "real-time display" mode is established. On the other hand, if, in step S50, an operation to select "conditional display" is detected to be made within the predetermined period, the flow proceeds to step S54, where the "conditional display" mode is established, and then the flow proceeds to the processing for a 100-people game in step S53.

By contrast, if, in step S46, an operation to participate as a player is detected to be made within the predetermined period, the flow proceeds to step S56, where it is checked whether or not an operation to request the display of reference data is made within a predetermined period. If such an operation is detected, the flow proceeds to step S58, where the current number of participants is displayed. Then, in step S60, data obtained by statistically processing the properties of participants is displayed, and then the flow proceeds to step S62.

The above-mentioned reference data displayed in steps S58 and S60 affects the would-be participant's interest in the game. If he wants to know it before finally deciding whether or not to participate, he can make an operation to request the display of such data. The operation is detected in step S56, and thus reference data is displayed as described above. On the other hand, if, after an operation to participate as a player is made, no operation is made within the predetermined period, the flow proceeds from step S56 directly to step S62, so that no reference data is displayed. In this way, unless the would-be participant is particularly interested, the display of reference data—extra processing—is automatically omitted.

In step S62, it is checked whether or not an operation to approve the display processing currently in effect is made within a predetermined period. As already described, when one "participates as a player", which of the "real-time display" mode and the "conditional display" mode to adopt is unified among all players so that they play under the same conditions, because the degree to which each is permitted to grasp the trend of others affects whether they change or do not change their answers. And no later participant can participate in a different display mode. Accordingly, if, in step S62, an operation of approval is detected, the flow proceeds to step S64, where the display mode is forcibly changed to the one in which the game is currently being conducted.

Next, in step S66, it is checked whether or not the game currently being conducted demands submission of the would-be participant's property data such as sex, age, etc. If submission of property data is demanded, the flow proceeds to step S68, where it is checked whether or not an operation to approve submission of property data is made within a predetermined period. Specifically, the operation involves inputting property data by checking check boxes or otherwise. If such input is made within a predetermined period, the flow proceeds to step S70, where the inputted property data is transmitted to the proponent. Now, in step S72, participation as a player is established, and then the flow proceeds to the processing for a 100-people game in step S53.

If, in step S66, the game currently being conducted is of the type that does not demand submission of property data, then the flow proceeds from step S66 directly to step S72, where participation as a player is established, and then the flow proceeds to the processing for a 100-people game in step S53.

On the other hand, if, in step S44, the predetermined period has already passed after the start of the game, the flow proceeds to step S74, where it is displayed that the deadline for participation as a player has already expired and participation as a monitor alone is possible. If the would-be participant loses interest on viewing it, he can make an operation to stop participation. In step S76, it is checked whether or not an operation to stop participation is made. If, after the display in step S74, an operation to stop participation is made within a predetermined period, the flow proceeds to step S78, where selection of and participation in the game is cancelled, and then the flow ends.

If no operation to stop participation is made within the predetermined period, the flow proceeds to step S46, In this case, in step S46, no operation to participate as a player is permitted, and the flow automatically and immediately proceeds to step S48, where participation as a monitor is established. In this way, when participation as a player is impossible, if no operation is made within the predetermined period, participation as a monitor is automatically established.

If, in step S62, no operation to approve the display processing currently in effect is detected to be made within the predetermined period, the flow proceeds to step S78, where selection of and participation in the game is cancelled. In this way, if the would-be participant feels no pleasure in the game currently being conducted in the "real-time display" or "conditional display" mode and loses interest in participation in it, unless he, after making an operation to participate as a player, makes some operation within a predetermined period, participation in the game is automatically canceled.

Also, if, in step S68, no operation to approve submission of property data is detected to be made within the predetermined period, the flow proceeds to step S78, where selection of and participation in the game is cancelled. In this way, if the would-be participant, for privacy reasons, does not want to submit property data demanded by the game currently being conducted, unless he, after making an operation to participate as a player, makes some operation within a predetermined period, participation in the game is automatically canceled.

Figure 7:
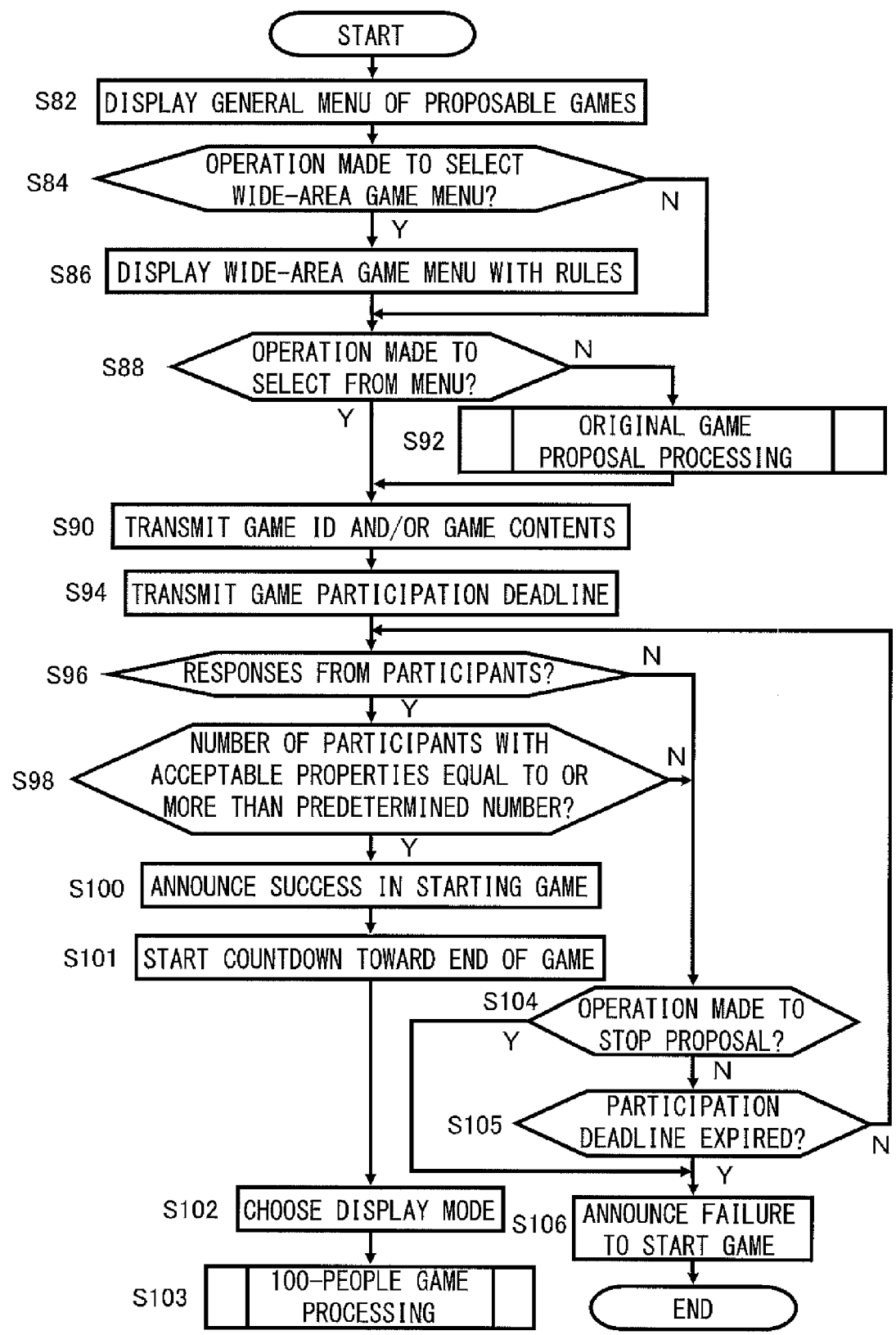
FIG. 7 is a flow chart showing the details of the processing for game proposal in step S30 in FIG. 5.

FIG. 7 is a flow chart showing the details of the processing for game proposal in step S30 in FIG. 5. When the flow starts, first, in step S82, a general menu of the games that can be proposed is displayed. Next, in step S84, it is checked whether or not an operation to select display of a menu dedicated to, among all the games, "wide-area games" is made within a predetermined period. The data for such a "wide-area game" is, as soon as one is planed, distributed, along with its rules, across a telephone network to the telephone communication portion of each cellular phone so as to be stored in the game storage portion.

If, in step S84, an operation to select the menu of wide-area games is detected to be made, the flow proceeds to step S86, where the game menu is displayed along with an outline of the rules of each game. With this display retained, the flow proceeds to step S88. On the other hand, if, in step S84, no operation to select the menu of wide-area games is detected to be made, the flow proceeds directly to step S88.

In step S88, it is checked whether or not, after the display of the game menu in step S82 or S86, an operation to select one of the games displayed there is made within a predetermined period. If an operation to select is detected to be made, the flow proceeds to step S90. On the other hand, if, in step S88, no operation to select from the menu is detected within the predetermined period, it is assumed that none of the existing games in the menu is satisfying, and thus the flow proceeds to processing for original game proposal in step S92, on completion of which the flow proceeds to step S90. The details of the processing for original game proposal in step S92 will be described later.

In step S90, the ID of the selected game is transmitted from the short-distance communication portion to propose the game. In a case where the flow has proceeded from the processing for original game proposal in step S92 to step S90, along with the ID, the data of the contents of the game is transmitted as well. Then, in step S94, the deadline for participation in the game is transmitted, and then, in step S96, it is checked whether or not there are responses from participants. In this case, as in step S4 in FIG. 5, to prevent overlap among responses from a plurality of participants, they are checked individually according to a predetermined traffic control process such as one operating on a first-access-first-served basis.

If, in step S96, responses from participants are detected individually, the flow proceeds to step S98. In step S98, it is checked whether or not the respondents fulfill the properties required by the game, then the IP addresses of the participants with acceptable properties are stored, and then it is checked whether or not the accumulated number of such participants is equal to or more than a predetermined number. If the number of participants with acceptable properties is equal to or more than the predetermined number, the flow proceeds to step S100, where an announcement of success in starting the game is transmitted to all participants. Then, in step S101, countdown toward the end of the game is started, then, in step S102, the display mode is chosen, and then the flow proceeds to the processing for a 100-people game in step S103.

On the other hand, if, in step S96, no response from any participant is detected or, in step S98, the accumulated number of participants with acceptable properties does not reach the predetermined number, the flow proceeds to step S104, where it is checked whether or not an operation to stop proposal of the game is made. If no such operation is detected, the flow proceeds to step S105, where it is checked whether or not the deadline for participation set in step S94 has expired. If the deadline has not expired yet, the flow returns to step S96, and thereafter steps S96, S98, S104, and S105 are repeated unless, in step 98, the number of participants with acceptable properties is equal to or greater than the predetermined number, or, in step S104, an operation to stop proposal is detected, or, in step S105, the deadline for participation is detected to have expired.

If, in step S104, an operation to stop proposal is detected, or, in step S105, the deadline for participation is detected to have expired, the flow proceeds to step S106, where an announcement of failure to start the game is transmitted from the short-distance communication portion to around, and then the flow ends.

Figure 8:
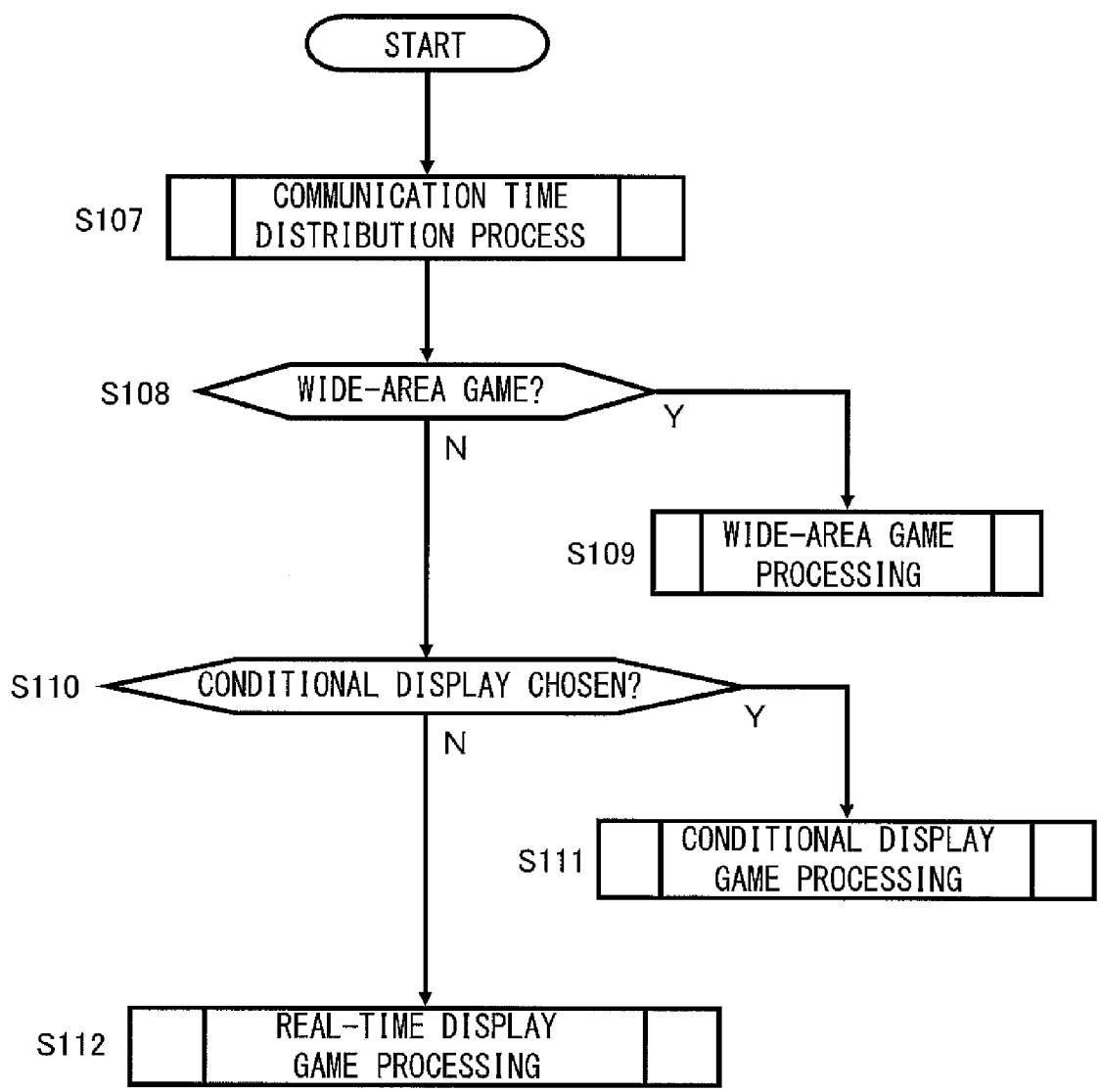
FIG. 8 is a flow chart showing the details of the processing for a 100-people game in step S53 in FIG. 6 and in step S103 in FIG. 7.

FIG. 8 is a flow chart showing the details of the processing for a 100-people game in step S53 in FIG. 6 and in step S103 in FIG. 7. When the flow starts, in step S107, processing for allocating communication times is executed. By this processing, communication times are allocated to a plurality of participants such that, when the proponent communicates with the participants individually, no overlap occurs among transmissions from different participants. As already described, to deal with an unpredictable number of communication partners as in step S4 in FIG. 5 and in step S96 in FIG. 7, a predetermined traffic control process such as one operating on a first-access-first-served basis is used to cope with overlap among responses from them. By contrast, once a 100-people game is started and participants are identified individually, as in step S107, overlap among responses from them is prevented by measures different from those used when an unpredictable number of communication partners are dealt with.

Thereafter, in step S108, it is checked whether or not the established game is a wide-area one. If it is a wide-area game, the flow proceeds to processing for a wide-area game in step S109. The details of this processing will be described later. If, in step S108, the established game is not a wide-area one, it is then a game conducted locally within the short-distance communication range, and thus the flow proceeds to step S110, where it is checked whether or not the "conditional display" mode is chosen. If conditional display is chosen, the flow proceeds to processing for a conditional display game in step S111. The details of this processing will be described later. On the other hand, if, in step S110, conditional display is not chosen, the flow proceeds to processing for a real-time display game in step S112. The details of this processing will be described later.

Figure 9:
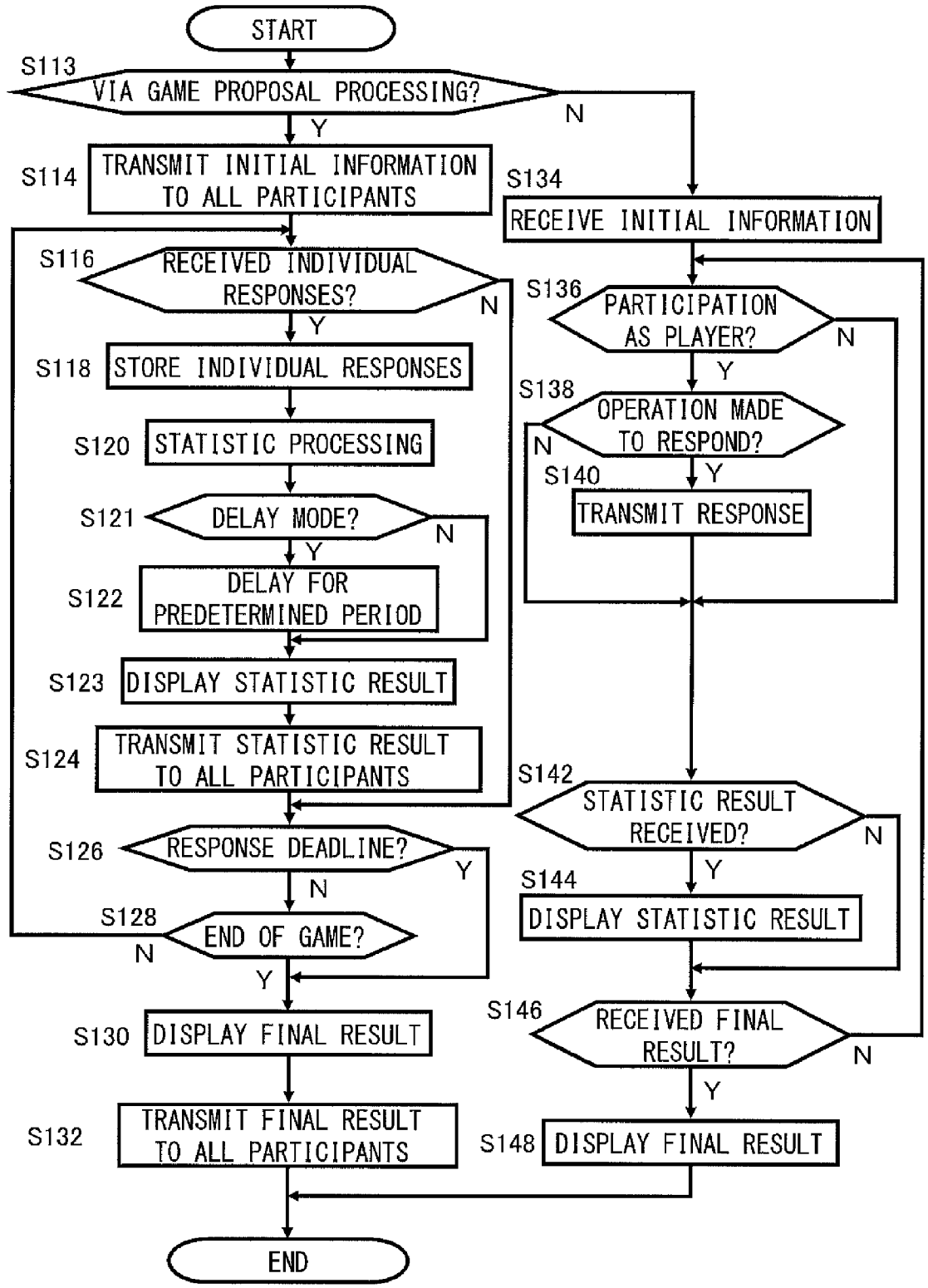
FIG. 9 is a flow chart showing the details of the processing for a real-time display game in step S112 in FIG. 8.

FIG. 9 is a flow chart shown in the details of the processing for a real-time display game in step S112 in FIG. 8. When the flow starts, in step S113, it is checked whether or not the flow started via the processing for game proposal shown in FIG. 7. This corresponds to checking whether or not one is the proponent of the game himself. If via the processing for game proposal, the game needs to be started from one's own cellular phone, and thus the flow proceeds to the steps starting with S114, where initial information of the game is transmitted to all participants. This corresponds to, for example, transmitting to all the participants a query like the one in the query area 64 in FIG. 2.

Next, in step S116, it is checked whether or not there are incoming individual responses in time zones allocated in step S107. If when all the time zones have passed, there has been an incoming response from any participant, the flow proceeds to step S118, where the contents of any newly received individual response is stored. Then, in step S120, the newly received individual responses is integrated with previously received, already stored responses and these are subjected to statistic processing.

Next, in step S121, it is checked whether or not the game is being conducted in a delay mode in which a game is so adapted that statistic results are displayed with intentional delay. If in the delay mode, in step S122, processing for delaying, when a statistic result is available, its display and transmission for a predetermined period is executed, and then the flow proceeds to step S123. Specifically, a code for automatically delaying display for a predetermined period is added to the data of a statistic result. On the other hand, if not in the delay mode, the flow proceeds from step S121 directly to step S123.

In step S123, display of a statistic result on one's own cellular phone is requested. Here, if a delay code has been added in the processing for producing a delay of a predetermined period in step S122, the display is effected automatically after the predetermined period. Next, in step S124, the statistic result is transmitted to all participants. Here also, if a delay code has been added in the processing for producing a delay of a predetermined period in step S122, the display of the statistic result on the cellular phones of other participants is effected automatically the predetermined period after reception of the statistic result.

Next, in step S126, it is checked whether or not the response deadline time has been reached and, if it has not been reached yet, the flow proceeds to step S128, where it is checked whether or not any condition for the end of the game is fulfilled. If no condition for the end of the game is fulfilled, the flow returns to step S116, and thereafter steps S116 through S128 are repeated unless, in step S126, the response deadline time is detected, or, in step S128, the end of the game is detected. Thus, based on responses and statistic results derived from them, the game proceeds.

On the other hand, if, in step S126, the response deadline time is detected, or, in step S128, the end of the game is detected, the flow proceeds to step S130, where the final result is displayed on one's own cellular phone. Simultaneously, in step S132, the final result is transmitted to all participants, and the flow ends. No code for delaying display is added to the final result; thus, as soon as the data of the final result is available, it is promptly displayed.

For the sake of simplicity, the foregoing has dealt with a case where the flow ends on completion of, with respect to a single query, the series of operations from transmission of the query to statistic processing of responses to display of the result. In the case of a game involving a plurality of queries, for each query, steps S114 through S132 in FIG. 9 are repeated. In this case, the end of the game in step S128 denotes not the end of the entire game, but the end of the series of operations with respect to one query. Likewise, the "final result" in steps S130 and S132 denotes not the final result of the entire game, but the final result with respect to one query.

What has been discussed above is the flow in a case where one is the proponent of the game himself. What will be discussed below is the flow in a case where one participates in a game proposed by another participant. This corresponds to a case where step S113 is reached not via the processing for game proposal but via the processing for game participation shown in FIG. 6.

In this case, the flow proceeds to step S134, where initial information is received from the proponent. This initial information corresponds to, for example, receiving a query like the one in the query area 64 in FIG. 2. Next, in step S136, it is checked whether or not participation is as a player. If participation is as a player, the flow proceeds to step S138, where it is checked whether or not an operation is made to respond to the initial information received in step S134. If such an operation is detected, then, in step S140, the response indicated by the result of the operation is transmitted to the proponent by short-distance communication, and the flow proceeds to step S142.

On the other hand, if, in step S136, participation as a player is not detected, or if, in step S138, no operation to respond is detected, the flow proceeds directly to step S142.

In step S142, it is checked whether or not a statistic result is received, and, if one is received, then, in step S144, display of the statistic result is requested, and then the flow proceeds to step S146. In a case where a delay code has been added to the statistic result, the display in step S144 is effected automatically with a delay of a predetermined period after reception of the data of the statistic result. If, in step S142, no statistic result is received, the flow proceeds directly to step S146.

In step S146, it is checked whether or not the final result of the game is received. If it is received, then, in step S148, it is displayed, and then the flow ends. As described above, the final result is displayed with no delay, and thus, if the display of the data requested in step S144 is delayed, the display of the final result in step S148 may be effected earlier than that. In this case, the request for display of the in-progress statistic result in step S144 becomes meaningless, and is therefore automatically canceled.

On the other hand, if, in step S146, no reception of the final result is detected, then the flow returns to step S136, and thereafter steps S136 through S146 are repeated until reception of the final result is detected. In this way, a participant of the game who has participated as a player can play the game by making responding operations while viewing the progress of the display in step S144. The responses are one after the next reflected in the statistic result.

On the other hand, if participation is not as a player, no responding operation is detected in step S138, and thus a participant can only enjoy the changing display passively.

Also in regard to the above-described flow in a case where one is a participant in a game, for the sake of simplicity, a case has been dealt with where the flow ends on completion of, with respect to a single query, the series of operations from reception of a query to response to it to reception and display of the statistic result. However, also in a case where one is a participant in a game, as described in connection with the repetition of steps S113 to S132 in a case where one is the proponent, for a game involving a plurality of queries, with respect to each query, steps S134 through S148 in FIG. 9 are repeated. In this case, the "final result" in steps S146 and S148 denotes not the final result of the entire game, but the final result with respect to one query.

Figure 10:
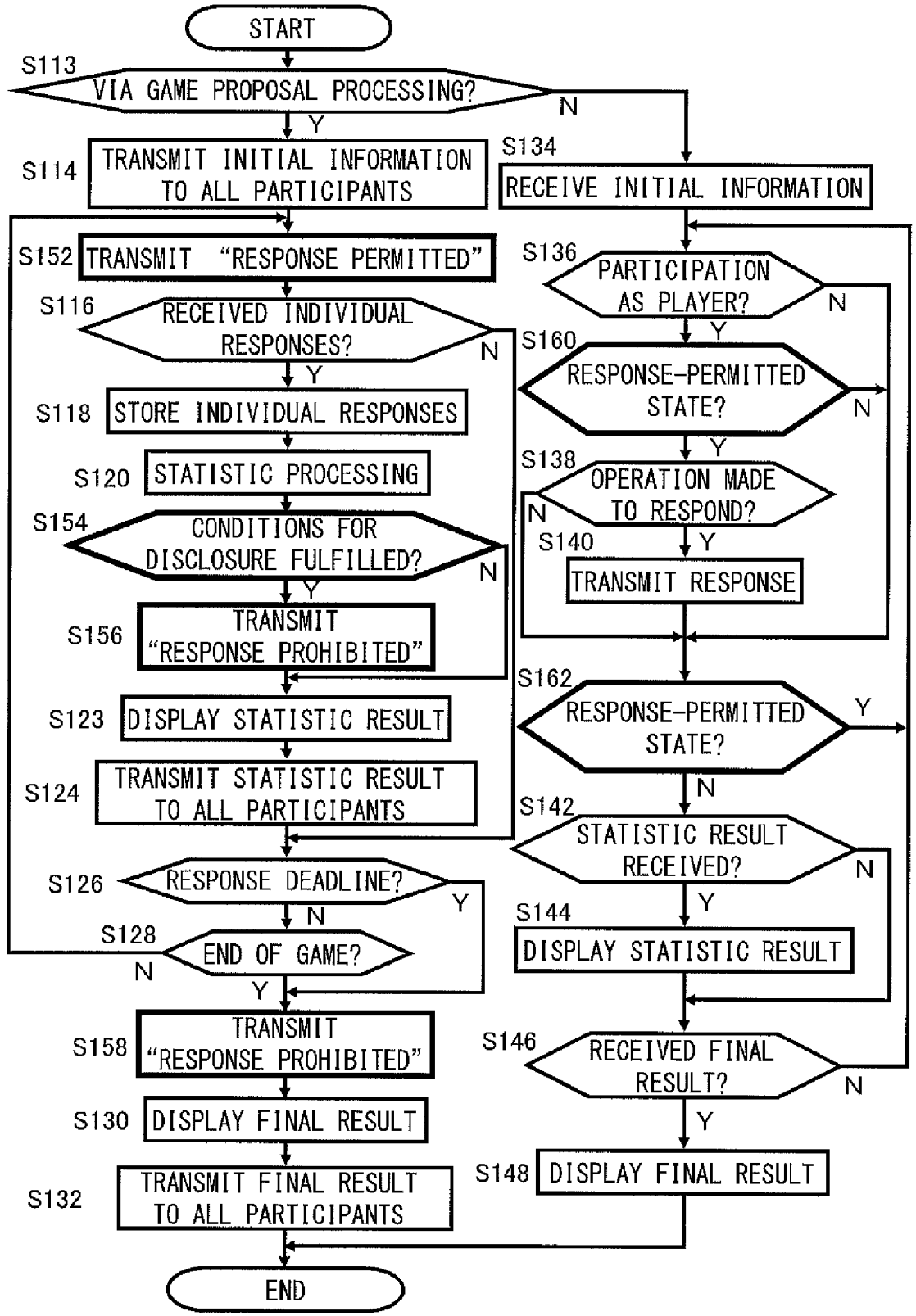
FIG. 10 is a flow chart showing the details of the processing for a requirement display game in step S111 in FIG. 8.

FIG. 10 is a flow chart showing the details of the processing for a conditional display game in step S111 in FIG. 8. This flow has many things common with the processing for a real-time display game shown in FIG. 9; accordingly, common steps are identified by common step numbers and their description will not be repeated.

In contrast, in the processing for a conditional display game shown in FIG. 10, those steps that differ from those in FIG. 9 are indicated by thicker lines and are identified by different step numbers; the following is an in-brief description focused on these steps. In the flow of the FIG. 10, in step S114, initial information of the game, for example a query like the one in the query area 64 in FIG. 2, is transmitted to all participants, and then the flow proceeds to step S152, where a "response permitted" signal indicating that a response is permitted is transmitted to each participant. To each participant, this "response permitted" signal and the later described "response prohibited" signal are transmitted whenever necessary so that the participant stays in a response-permitted state after receiving the "response permitted" signal until receiving the "response prohibited" signal. Since the proponent himself can participate in the game under the same conditions, he too can respond to a query only when the participant is in the response-permitted state.

Moreover, as will be described later, so long as any participant is in the response-permitted state, the display of the statistic result is not updated either for the proponent or for any participant; the progress of the statistic result is intentionally concealed for the sake of the pleasure of the game.

As described above, except that the "response permitted" signal is additionally transmitted in step S152, the flow proceeds from step S114 through step S120 as in FIG. 9, and step S120 is followed by step S154, where it is checked whether or not conditions for disclosing the statistic result are fulfilled. If the conditions for disclosing the statistic result are fulfilled, then, in step S156, the "response prohibited" signal is transmitted to all participants and, in step S123, the statistic result is displayed for the proponent himself; then the flow proceeds to step S124. In the case of FIG. 10, no processing for producing a delay as in steps S121 and S122 in FIG. 9 is executed. On the other hand, if, in step S154, the conditions for disclosing the statistic result are not detected to be fulfilled, the flow proceeds directly to step S124. In step S124, as in FIG. 9, the statistic result is transmitted to all other participants, and then the flow proceeds to step S126.

In this way, for the proponent himself, unless the conditions for disclosure are detected to be fulfilled in step S154, the statistic result is not displayed in step S123. By contrast, for other participants, irrespective of whether or not the conditions for disclosure are fulfilled, the statistic result itself is transmitted. If, however, the conditions for disclosure are not detected to be fulfilled in step S154, the "response prohibited" signal is not transmitted in step S156.

Thereafter, the flow proceeds through steps S126 and S128 as in FIG. 9, and then, if, in step S128, the end of the game is not detected, the flow returns to step S152. In step S152, the "response permitted" signal is transmitted, and this, if the "response prohibited" signal has been transmitted in step S156, brings participants back into the response-permitted state.

In a case where the flow returns to step S152 not via step S156, participants have already been in the response-permitted state, and therefore transiting the "response permitted" signal in step S152 is meaningless. Even then, whenever the flow proceeds through step S152, the proponent always transmits the "response permitted" signal without checking the state of participants. On the other hand, participants, if they receive the "response permitted" signal in the response-permitted state, neglect it by simply continuing to stay in the response-permitted state. Needless to say, instead of this flow, it is possible to adopt one in which a history is kept of whether or not participants are in the response-permitted state so that, if they are in the response-permitted state, the "response permitted" signal is not transmitted unnecessarily in step S152.

If, in step S128 in FIG. 10, the end of the game is detected, the flow proceeds to step S158, where the "response prohibited" signal is transmitted, and then the flow proceeds to step S130.

Also in this case, if the flow reaches step S158 via step S156, participants are already in the response-prohibited state, and therefore transmitting the "response prohibited" signal in step S158 is meaningless. Even then, whenever the flow proceeds through the step S158, the proponent always transmits the "response prohibited" signal without checking the state of participants. On the other hand, participants, if they receive the "response prohibited" signal in the response-prohibited state, neglect it by simply continuing to stay in the response-prohibited state. Needless to say, instead of this flow, it is possible to adopt one in which a history is kept of whether or not participants are in the response-permitted state so that, if they are in the response-prohibited state, the "response prohibited" signal is not transmitted unnecessarily in step S158.

Next, a description will be given of how the flow on the part of a participant responds to the "response permitted" signal and "response prohibited" signal transmitted from the proponent as described above. In FIG. 10, in a case where the flow reaches step S113 not via the processing for game proposal but via the processing for game participation shown in FIG. 6, the flow proceeds to step S134, where, as in FIG. 9, initial information from the proponent is received.

In FIG. 10, if, in step S136, participation is as a player, the flow proceeds to step S160, where it is checked whether or not the cellular phone of the participant is in the response-permitted state. Only if it is in the response-permitted state, the flow proceeds through steps S138 and S140 to step S162. On the other hand, if, in step S160, the cellular phone of the participant is not detected to be in the response-permitted state, the flow proceeds directly to step S162. Thus, unless the participant is in the response-permitted state, he cannot make any operation to respond.

In step S162, it is again checked whether or not the cellular phone of the participant is in the response-permitted state. The purpose here, however, is to decide whether or not to display the received statistic result. Specifically, if, in step S162, the response-permitted state is detected, the flow returns to step S136, and thereafter steps S136 through S162 are repeated until the response-permitted state is no longer detected in step S162. Thus, even if the latest statistic result has been received, it is concealed from being displayed, so that the participant cannot know the statistic result.

By contrast, if, in step S162, the response-prohibited state is detected, the flow can then proceed to step S142 and, if, in step S142, the latest statistic result is detected to be received, it is displayed in step S144. Then if, in step S146, the final result is received, the flow proceeds to step S148, where it is displayed.

If, in step S146, the final result is not received, the game is still being conducted; thus, having displayed the latest statistic result in step S144, the flow returns to step S136. Here, if the game is still being conducted, the cellular phone of the participant is already back in the response-permitted state, This is because, in the flow on the part of the proponent, immediately after the transmission of the "response prohibited" signal in step S156, back in step S152, the "response permitted" signal is transmitted. Accordingly, the flow on the part of the participant, after returning to step S136, repeats steps S136 through S162 unless the proponent transmits the "response prohibited" signal on detecting fulfillment of the conditions for disclosure on the next occasion, and thus cannot reach step S144, with the result that the latest statistic result is again concealed.

In the flow shown in FIG. 10, whether or not to permit response to a query and whether or not to permit display of the statistic result are linked in a reversed relationship. The reason is that the period in which response is prohibited is comparatively short and substantially does not stop the progress of the game, and that giving up response for the time being on one turning point or other is acceptable in statistic processing.

This, however, is in no way meant to limit the configuration with which to implement the invention; it is possible to link the detection of whether or not the conditions for disclosure are fulfilled only to whether or not to permit display of the statistic result, leaving response possible at any time independently.

Figure 11:
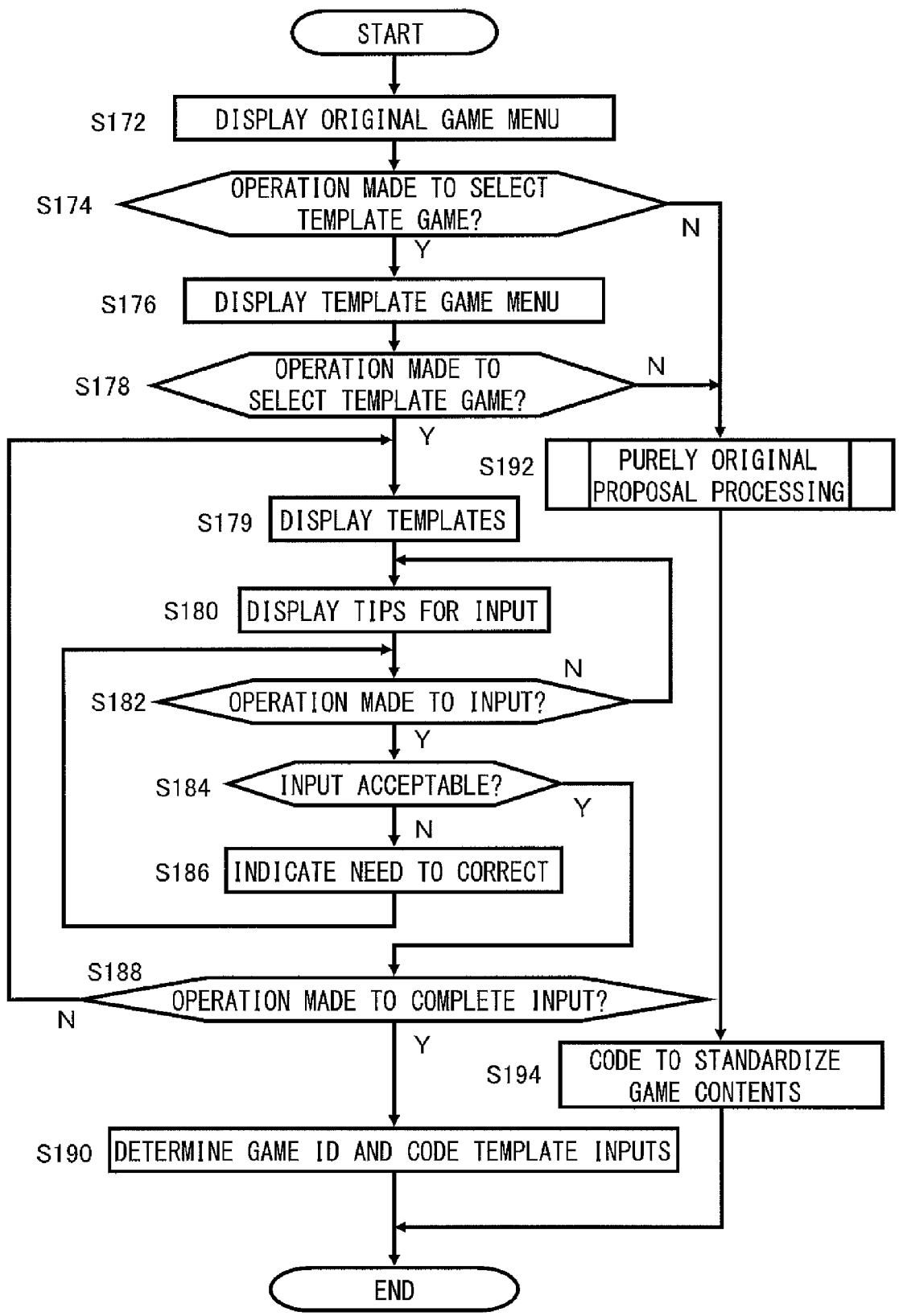
FIG. 11 is a flow chart showing the details of the processing for original game proposal in step S92 in FIG. 7.

FIG. 11 is a flow chart showing the details of the processing for original game proposal in step S92 in FIG. 7. When the flow starts, in step S172, a menu of original games is displayed. In this display of the original menu, a choice can be made between, on one hand, semi-original template games, for which templates for inputting rules and contents are available, and, on the other, a menu for creating an original game with complete freedom.

In step S174, it is checked whether or not an operation to choose the template game menu is made, and, if such an operation is detected, then, in step S176, a menu showing the detailed contents of template games is displayed. Then if, in step S178, an operation to select one of the template games is detected, the flow proceeds to step S179, where one of the templates needed to construct the game is displayed.

For example, in the case of a questionnaire game like the one shown in FIG. 2, a template for inputting a query and options in the query area 64 is displayed. Typically, for each game, a plurality of templates are prepared as needed to conduct it. For example, other than the query-and-options template mentioned above, there are prepared ones for selecting the summarizing method in the summary area 66 and for selecting and setting the display layout etc. There are also prepared templates for setting game participation qualification properties, for choosing between "real-time display" and "conditional display", for setting conditions for conditional display, etc. In step S179, these templates are displayed one after another in predetermined order.

Such a template game is useful in a case where, as with a questionnaire game, the game has a universal form but its contents need to be created freely; a template game makes it possible to propose, as a game, contents of interest to one without spending time in the setting of basic design such as its form and rules.

Next, in step S180, tips on how to input to the template are displayed, and, in step S182, it is checked whether or not an operation to input to the template is made. If no input is made within a predetermined period or if input is made inappropriately, it is assumed that no operation to input is made, and the flow returns to step S180. In step S180, as necessary, the tips for input are replaced with those which more suit the situation.

If, in step S182, an appropriate operation to input is detected to be made, the flow proceeds to step S184, where what has been inputted is checked. If there is a defect in what has been inputted, the flow proceeds to step S186, where it is displayed that correction is needed, and then the flow returns to step S182; thereafter, steps S180 through S186 are repeated until what has been inputted is judged to be acceptable in step S184.

If, in step S184, what is inputted is judged to be acceptable, the flow proceeds to step S188, where it is checked whether or not an operation to complete input is made. If no such operation is detected to be made, the flow returns to step S179, where the next template is displayed.

Thereafter, until an operation to complete input is detected in step S188, steps S179 through S188 are repeated. On the other hand, if, in step S188, an operation to complete input is detected, the flow proceeds to step S190, where the game ID is definitely determined and coding of what has been inputted to templates is performed, and then the flow ends. The game ID is preliminarily assigned when templates are presented, and is definitely determined in step S190. If input to all the prepared templates is completed, even if no operation to complete input is expressly made in step S188, it is assumed that input has been completed, and the flow proceeds to step S190.

If, in step S174, no operation to display the template game menu is made, or if, in step S178, no operation to select one of the template games displayed is made, the flow proceeds to processing for purely original proposal in step S192. In this processing, through operations on the first manipulation portion 12 and with the GUI provided by the first display portion 18, it is possible to create an original game with complete freedom. When creation of a game is completed, the flow proceeds to step S194, where coding is performed to standardize the contents of the game, and then the flow ends.

Figure 12:
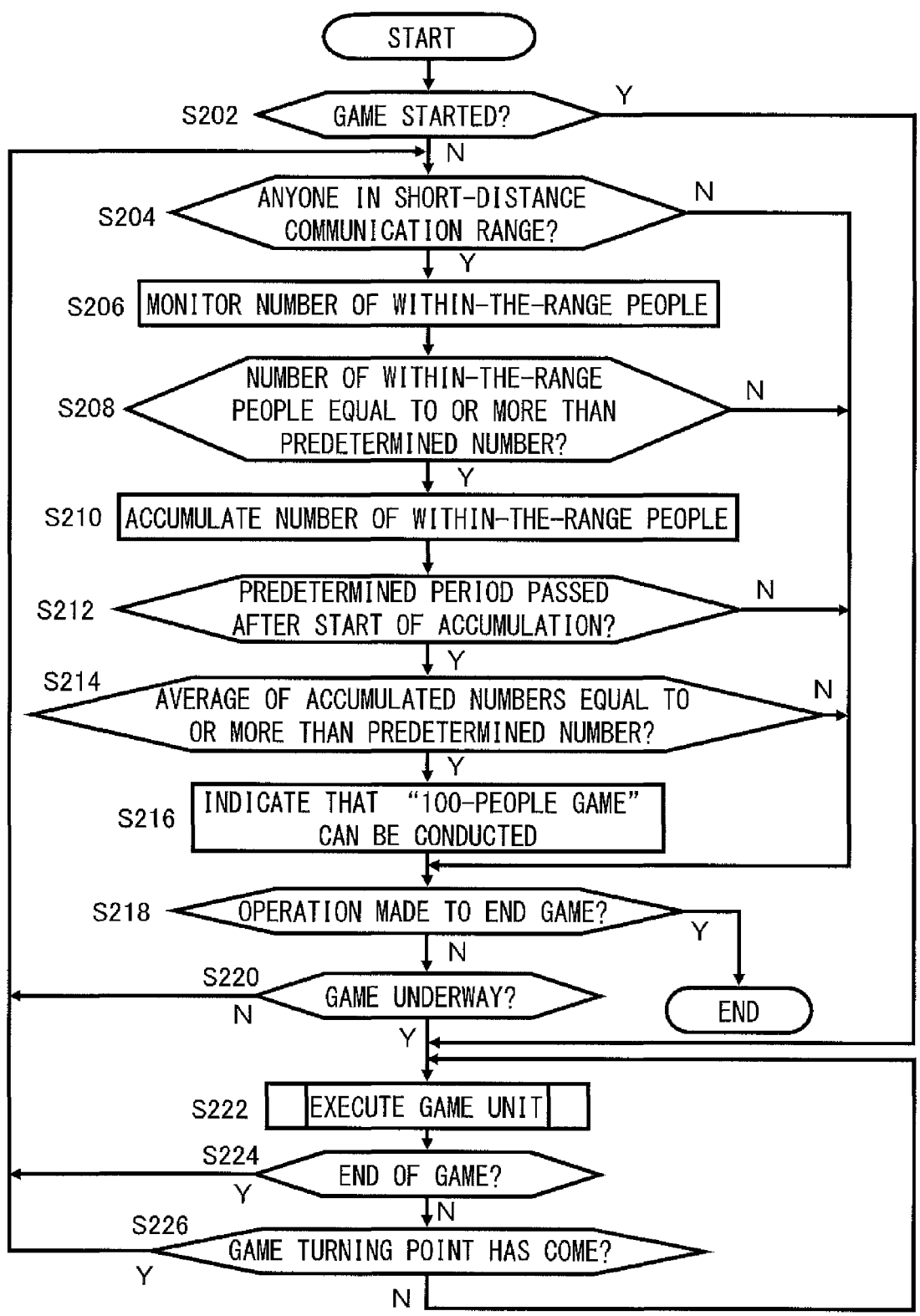
FIG. 12 is a flow chart showing the details of the processing for an ordinary game in step S36 in FIG. 5.

FIG. 12 is a flow chart showing the details of the processing for an ordinary game in step S36 in FIG. 5. This processing is concerned basically with a game conducted on a cellular phone alone as conventionally done, and additionally includes the function of, whenever it becomes possible to conduct a "100-people game" while an ordinary game is being conducted, notifying of the situation.

When the flow starts, in step S202, it is checked whether or not a game has been started. If no game has been started, then, in step S204, it is checked whether or not there is a person carrying another cellular phone within the short-distance communication range. This step is similar to step S2 in FIG. 5, but it does have the significance of checking, in a case where the processing for an ordinary game was started with no person detected in the short-distance communication range in step S2 in FIG. 5, whether or not the situation has later changed such that there is now a person in the short-distance communication range.

The following steps from step S206 through step S214 in FIG. 12 have the same purpose as steps S4 through S12 in FIG. 5, and have the function of confirming that the number of within-the-range people located nearby is stably equal to or more than a predetermined number. If that is confirmed, the flow proceeds to step S216, where it is displayed that, despite in the middle of the processing for a normal game, it is now possible to conduct a "100-people game", and the flow proceeds to step S128. When the flow has proceeded from step S202 to step S216, no game has been started yet; thus, viewing that display, the user can make an operation to switch to a "100-people game".

By contrast, when the flow has proceeded from step S202 to step S204 and there no person is detected in the short-distance range, or if, in step S208, the number of within-the-range people detected is less than a predetermined number, or, in step S212, a predetermined period has not yet passed since the start of accumulation, or, in step S214, the average of the accumulated numbers of within-the-range people is not detected to be equal to or more than a predetermined number, the flow proceeds directly to step S218 without making the display in step S216.

In step S218, it is checked whether or not an operation to end the game is made and, if no such operation is detected, the flow proceeds to step S220, where it is checked whether or not a game is underway. If no game is underway, the flow returns to step S204, and thereafter, unless, in step S218, an operation to end the game is detected or unless, in step S220, a game is detected to be underway, steps S204 through S220 are repeated to continue detecting a state in which a "100-people game" can be conducted. During this repetition, it is at any time possible to make an operation to start an ordinary game and, whenever such an operation is made, in step S220, a game is detected to be underway.

If, in step S220, a game is detected to be underway, the flow proceeds to step S222, where, according to a predetermined game flow, the unit of the game is executed. On completion of the execution of that unit, the flow proceeds to step S224, where it is checked whether or not the game has ended. If the game is detected to have ended, the flow returns to step S204, and thereafter steps S204 through S220 are repeated to continue detecting a state in which a "100-people game" can be conducted. After the game has ended, unless an operation to start another game is made, in step S220, no game is detected to be underway.

On the other hand, if, in step S224, the game has not ended yet, the flow proceeds to step S226, where it is checked whether or not, at the end of the execution of the game in step S222, a turning point of the game has come. Here, a turning point denotes, for example, a state in which the execution of a game is being suspended to allow the user an unlimited length of time to make a selection operation to proceed to the next stage of the game. If such a turning point of the game has already come, the flow proceeds to step S204, and thereafter steps S204 through S220 are repeated to continue detecting a state in which a "100-people game" can be conducted. Also when a turning point of the game has come and the game is in a suspended state, unless an operation to restart the game is made, in step S220, no game is detected to be underway.

If, in step S226, a turning point of the game is not detected to have come, the flow returns to step S222 to continue to execute the next game unit.

If, in step S202, a game is detected to be started, the flow proceeds to step S222 to start the game unit.

As described above, in the embodiments of the invention, even in the middle of the processing for an ordinary game, so long as the progress of the game is not hampered, detection of a state in which a "100-people game" can be conducted is continued.

Figure 13:
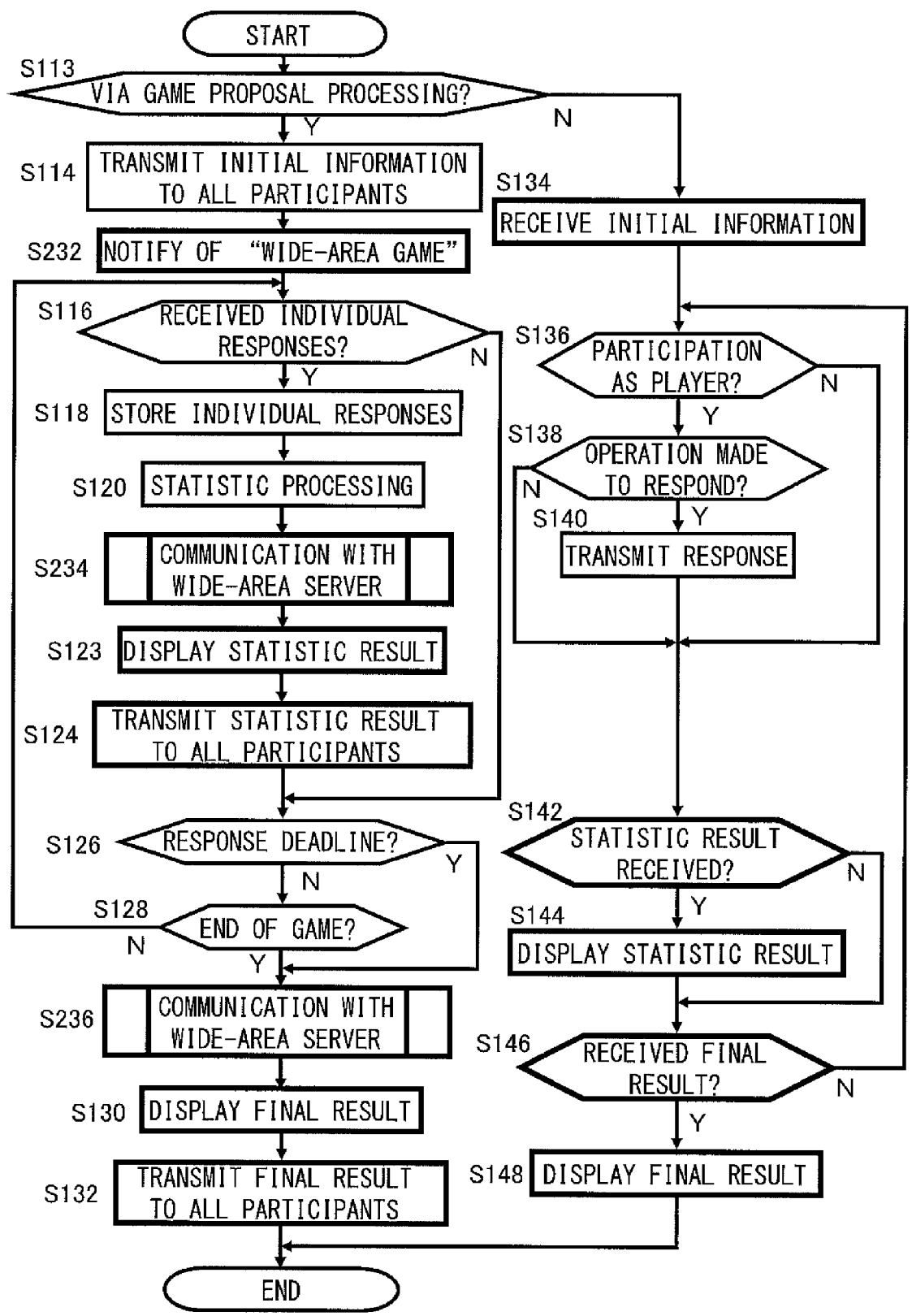
FIG. 13 is a flow chart showing the details of the processing for a wide-area game in step S109 in FIG. 8.

FIG. 13 is a flow chart that shows the details of the processing for a wide-area game in step S109 in FIG. 8. This flow too has many things common with the processing for a real-time display game shown in FIG. 9; accordingly, common steps are identified by common step numbers and their description will not be repeated.

In contrast, in the processing for a conditional display game shown in FIG. 13, those steps that differ from those in FIG. 9 are indicated by thicker lines and are identified by different step numbers; the following is an in-brief description focused on these steps. Furthermore, in the flow shown in FIG. 13, there are steps in which the operations performed are themselves the same as in FIG. 9 but the data handled is not data within the short-distance range but wide-area statistic data. These steps bear step numbers common to FIG. 9 but are indicated by thicker lines.

In the flow shown in FIG. 13, in step S114, initial information of a game, for example a query like the one in the query area 64 in FIG. 2, is transmitted to all participants, and then the flow proceeds to S232, where all participants are notified that the game is a "wide-area game". This permits participants to recognize that their responses are not kept within the short-distance communication range but are gathered together in a wide-area server and are spread over a wide area.

In the flow shown in FIG. 13, in step S120, responses from participants within the short-distance communication range are subjected to statistic processing as in FIG. 9. Next, in step S234, communication is conducted with a wide-area server over the Internet across a telephone network so that the data having undergone the statistic processing is uploaded to the wide-area server and that the wide-area statistic data obtained through statistic processing by the wide-area server is downloaded. Thus, the operations performed in the following steps, namely display of the statistic result in step S123 and transmission of the statistic result to all participants in step S124, are themselves the same as in FIG. 9, but the contents handled there are not statistic data within the short-distance communication range but the downloaded wide-area statistic data.

In FIG. 13, first, in step S120, statistic processing is performed on the responses received by the short-distance communication portion, and the result is uploaded to the wide-area server in step S234. Instead, step S120 may be skipped, and the raw data of individual responses stored in step S118 may be uploaded directly to the wide-area server in step S234. Instead, when the data having undergone statistic processing is uploaded in step S120, together the raw data of individual responses in step S118 may be uploaded as reference information.

The foregoing has discussed communication of an in-progress result with the wide-area server. In the flow shown in FIG. 13, also when, in step S128, the game ends, the flow proceeds to step S236, where communication is conducted with the wide-area server over the Internet across a telephone network so that the final result having undergone statistic processing is uploaded to the wide-area server and that the final result in the form of wide-area statistic data obtained through statistic processing by the wide-area server is downloaded. Thus, the operations in the following steps, namely display of the final result in step S130 and transmission of the final result to all participants in step S132 are themselves the same as in FIG. 9, but the contents handled there are not statistic data within the short-distance communication range but the downloaded wide-area statistic data. The contents in the wide-area statistic data column 98 in FIG. 4 are information having undergone such processing.

Also in step S236 mentioned above, instead of the result of statistic processing being uploaded to the wide-area server, the raw data of individual responses stored may be uploaded directly to the wide-area server in step S236. Instead, together with the data having undergone statistic processing, the raw data of individual responses may be uploaded as reference information. That is, the same applies here as with step S234.

The flow on the part of a participant in FIG. 13 includes operations that are themselves the same as those in FIG. 9, but the contents handled there are different. First, the initial information received in step S134 contains a notification, transmitted in step S232, to the effect that the game is a "wide-area game". Moreover, the statistic result received in step S142 and displayed in step S144 and the final result received in step S146 and displayed in step S148 are not statistic data within the short-distance communication range but the downloaded wide-area statistic data.

Figure 14:
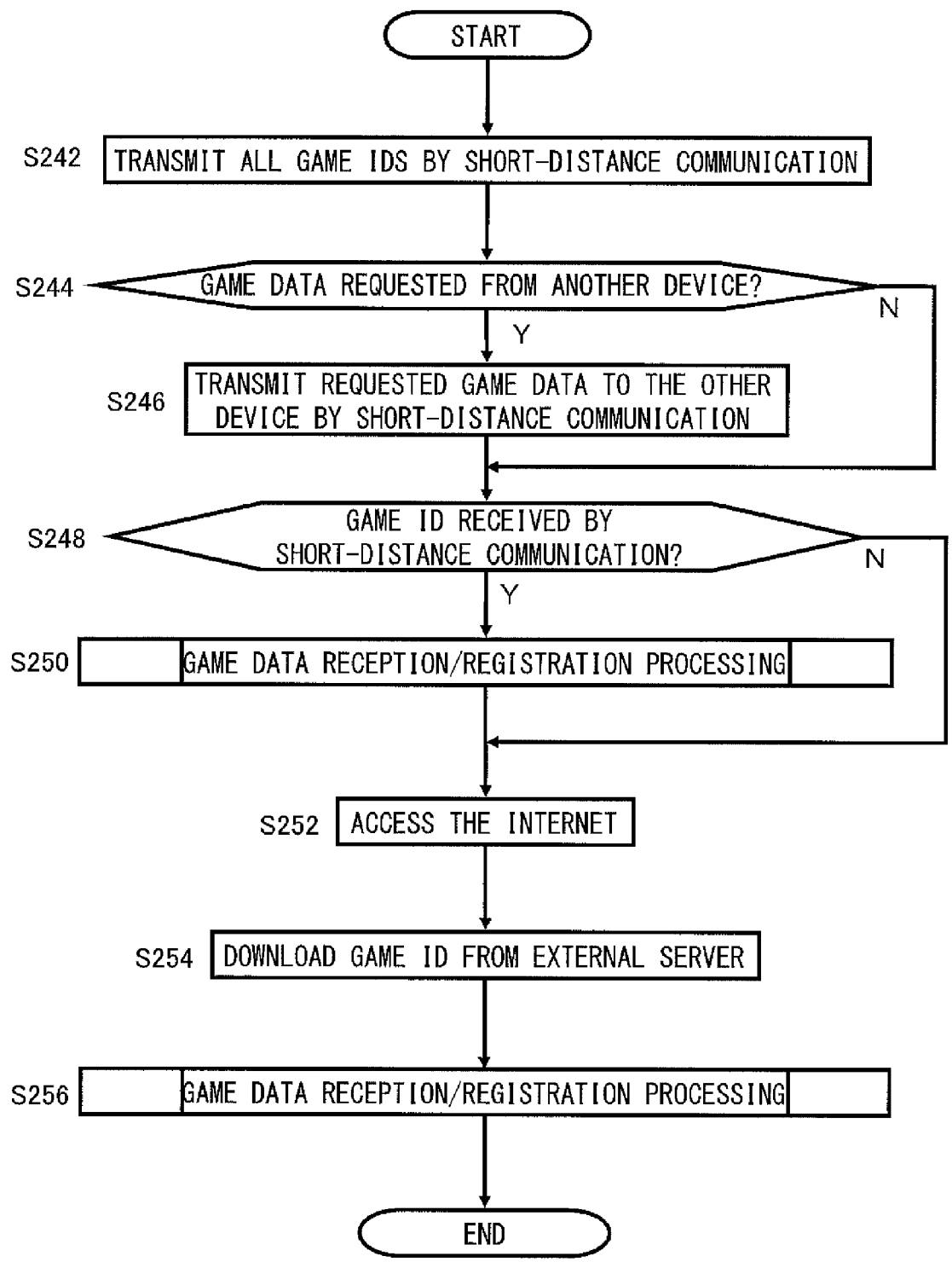
FIG. 14 is a flow chart showing the details of the processing for game data updating in step S26 in FIG. 5.

FIG. 14 is a flow chart showing the details of the processing for game data updating in step S26 in FIG. 5. When the flow starts, in step S242, the IDs of all the games stored in one's own apparatus are transmitted from the first near-field communication portion 26 to outside. Subsequently, in step S244, it is checked whether or not a request to transmit the game data of a specified ID is being received from another apparatus by the first near-field communication portion 26. If such a request is being received, the requested game data is transmitted from the first near-field communication portion 26 to the apparatus from which the request was received, and then the flow proceeds to step S248. On the other hand, if, in step S244, no such request is detected, the flow proceeds directly to step S248. These are the operations for exporting game data stored in one's own apparatus from the first short-distance communication portion 26 to another apparatus.

On the other hand, step S248 and the following steps are operations for importing game data from outside to one's own apparatus. First, in step S248, it is checked whether or not a game ID is received from another apparatus by the first near-field communication portion 26. If one is received, the flow proceeds to step S250, where processing for game data reception/registration is executed, and then the flow proceeds to step S252. On the other hand, if, in step S248, no game ID is detected to be received, the flow proceeds directly to step S252.

In step S252, the Internet is accessed from the first telephone communication portion 24. Then, in step S254, a game ID is downloaded from an external server that holds game data, and then, in step S256, processing for game data reception/registration is executed, and then the flow ends.

As described above, game data can be imported from outside either by importing it from another apparatus via the first near-field communication portion 26 or by importing it from an external server over the Internet via the first telephone communication portion 24. The details of the processing for game data reception/registration in steps S250 and S256 will be described with reference to the next figure.

Figure 15:
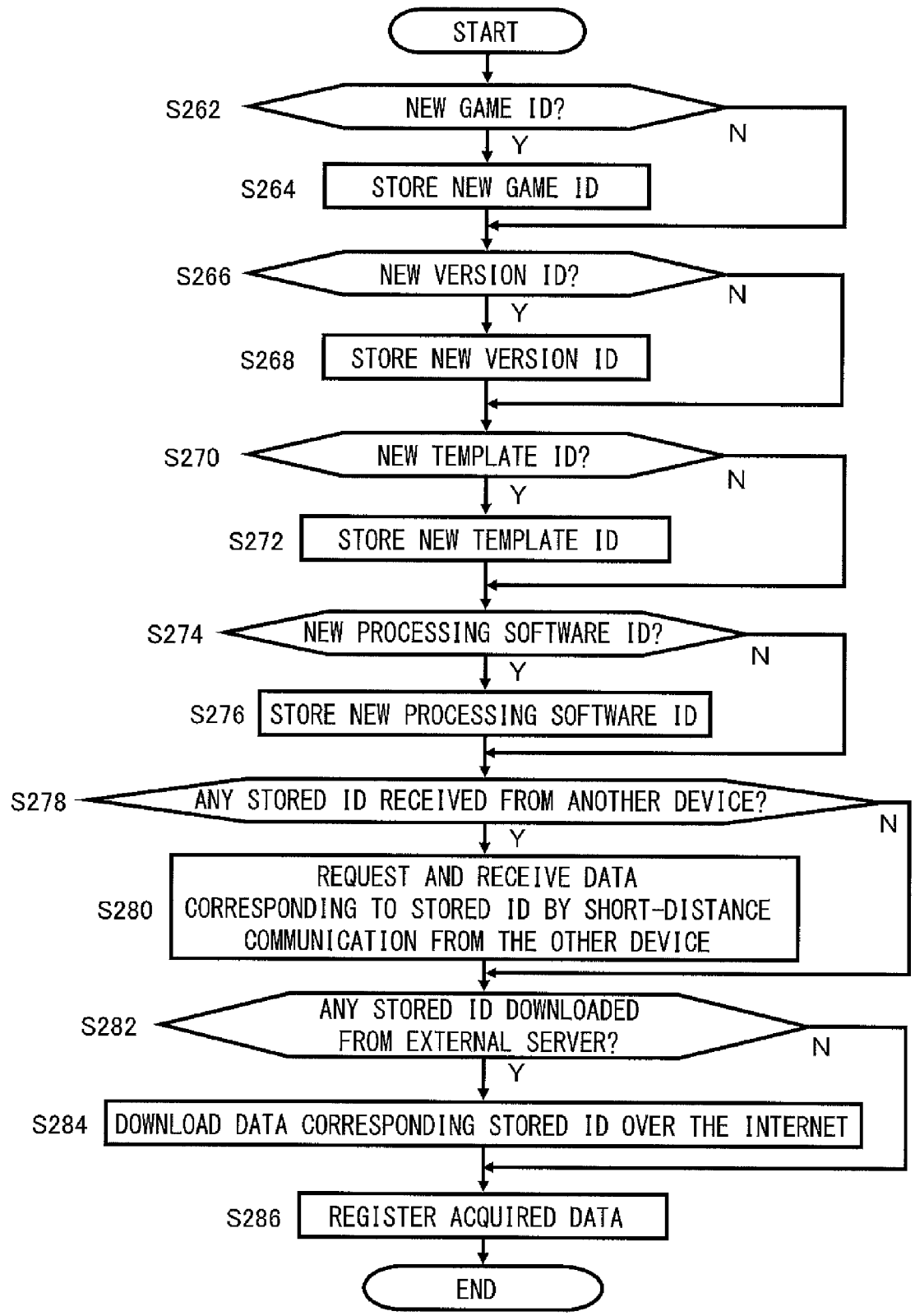
FIG. 15 is a flow chart showing the details of the processing for game data reception/registration in steps S250 and S256 in FIG. 14.

FIG. 15 is a flow chart showing the details of the processing for game data reception/registration in steps S250 and S256 in FIG. 14. When the flow starts, in step S262, it is checked whether or not a game ID has newly arrived that has not yet been registered in one's own apparatus. If there is a new game ID, it is stored in step S264, and then the flow proceeds to step S266. On the other hand, if, in step S262, no newly arrived game ID is detected, the flow proceeds directly to step S266.

In step S264, the newly arrived ID is stored with a code attached to it that distinguishes whether it was received from another apparatus by short-distance communication or it was downloaded from an external server over the Internet. This applies to any other newly arrived ID mentioned in the following description.

In step S266, it is checked whether or not an ID of a new version of an already registered game has newly arrived. If there is an ID of a new version, it is stored in step S268, and then the flow proceeds to step S270. On the other hand, if in step S266, no newly arrived version ID is detected, the flow proceeds directly to step S270.

In step S270, it is checked whether or not a new template ID of an already registered game has newly arrived. If there is a new template ID, it is stored in step S272, and then the flow proceeds to step S274. On the other hand, if, in step S270, no new template ID is detected, the flow proceeds directly to step S274.

In step S274, it is checked whether or not an ID of new processing software related to game execution in general has newly arrived. If there is a new processing software ID, it is stored in step S276, and then the flow proceeds to step S278. On the other hand, if, in step S274, no new processing software ID is detected, the flow proceeds directly to step S278.

In step S278, if there is any ID stored in steps S264, S268, S272, and S276, it is checked whether or not there is any stored ID that was received from another apparatus through communication by the first near-field communication portion 26. If there is any stored ID received from another apparatus, the flow proceeds to step S280, where the data corresponding to the stored ID is demanded from the other terminal by short-distance communication and, when it is received, the flow proceeds to step S282. On the other hand, if, in step S278, no stored ID is detected to have been received from another apparatus, the flow proceeds directly to step S282.

In step S282, if there is any ID stored in steps S264, S268, S272, and S276, it is checked whether or not there is any stored ID that was downloaded from an external server. If there is any stored ID downloaded from an external server, the flow proceeds to step S284, where the data corresponding to the stored ID is downloaded over the Internet via the first telephone communication portion 24, and then the flow proceeds to step S286. On the other hand, if, in step S282, no stored ID is detected to have been downloaded from an external server, the flow proceeds directly to step S286.

In step S286, the data acquired by being received in step S280 or by being downloaded in step S284 is registered in the first game storage portion 22.

As described above, in the embodiments of the invention, data related to a game enjoyed by the operation of the first near-field communication portion 26 is acquired from an external server over the Internet via the first telephone communication portion 24. In this case, another apparatus located nearby may have downloaded the desired game-related data, and therefore, first, an attempt is made to acquire the game-related data from another apparatus by the first near-field communication portion 26; if no other apparatus has the game-related data, one's own apparatus itself accesses the Internet and downloads the game-related data. When one's own apparatus acquires game-related data, it then tries to export it from the first near-field communication portion 26 to another apparatus around.

The details of updating through acquisition and sharing of game-related data proceed according to the flow charts in FIGS. 14 and 15. As will be clear from step S26 in FIG. 5, at the end of a game, that processing for game data updating is always executed to promote acquisition and sharing of game-related data.

Figure 16:
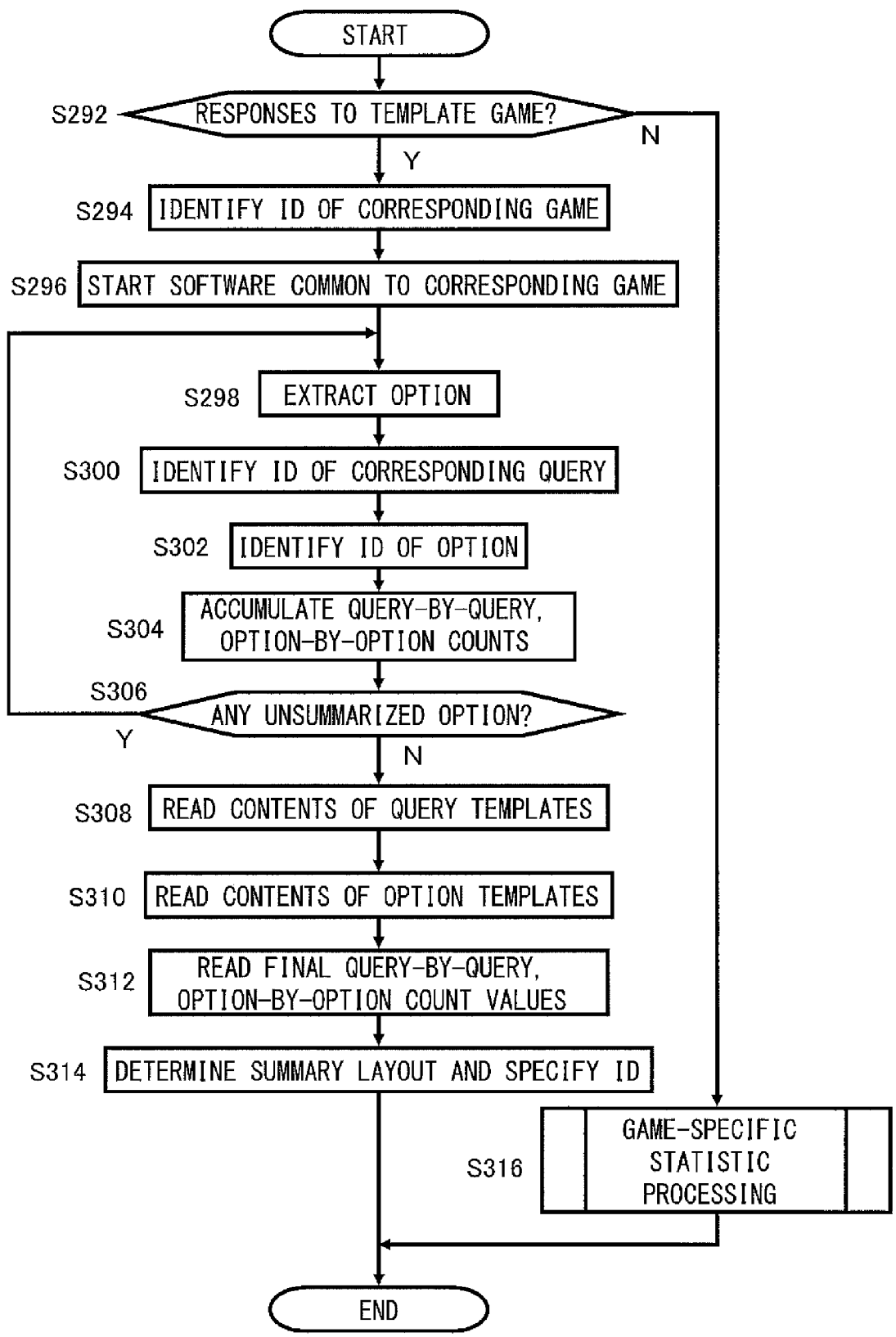
FIG. 16 is a flow chart showing the details of the statistic processing in step S120 in FIGS. 9, 10, and 12.

FIG. 16 is a flow chart showing the details of the statistic processing in step S120 common to FIGS. 9, 10, and 12. When the incoming individual responses are stored in step S118 and the step S120 is reached, the flow starts. In step S292, it is checked whether or not the responses are in response to a template game. If they are in response to a template game, the flow proceeds to step S294, where the ID of the game corresponding to the responses is identified. Then, based on the identified ID, in step S296, the application software common to the corresponding template game is started. This common software is common irrespective of the contents of the queries, options, etc. inputted to templates.

When the software is started, the flow proceeds to step S298, where, out of the responses stored, one response option is extracted. Then, in step S300, the ID of the query corresponding to the extracted option is identified. Then, in step S302, the ID of the extracted option itself is identified. Through these operations, the query and the ID assigned to it are definitely determined, and thus the flow proceeds to step S304, where, based on the thus determined ID, query-by-query and option-by-option classification is performed, and the corresponding accumulated counts are incremented.

On completion of the counting, in step S306, it is checked whether or not there remains any unsummarized option. If there is an unsummarized option, the flow returns to step S298, where the next option is extracted. If what is extracted here is responsive to a different query, it is detected in step S300 so that, in step S304, the counts for the different query are incremented.

Thereafter, until, in step S306, it is confirmed that there remains no unsummarized option, the loop from step S298 through step S306 are repeated. This loop is processed formally by the common software irrespective of the contents of queries and options.

When all the stored response options have been subjected to classified counting, then, in step S306, it is judged that there remains no unsummarized option. Thus, the flow proceeds to step S308, where the contents of the queries inputted to templates for queries are read out. Then, in step S310, the contents of the options inputted to templates for options are read out. Then, in step S312, the final count values accumulated one for each option are read out. In step S314, based on what has thus been read out, the summary layout to be applied to the display of the summary result is decided. Specifically, out of a plurality of common layouts previously prepared for corresponding games, the one that most suits the display of what has been read out from step S308 through step S312 is decided, and the decided layout is specified by its ID. Game participants already have information on the contents of queries and of their respective options and in addition have layout data, and accordingly what now needs to be transmitted as a statistic result to each participant are the query-by-query and option-by-option final count values read out in step S312 and the summary layout ID specified in step S314. Now, participants, based on the data they are previously provided with and the data they have received as a statistic result, can display the statistic result in a layout like one of those shown in FIGS. 2 to 4 on their own cellular phones.

As described above, for a template game, its execution is processed by common software irrespective of the contents inputted to templates, and also the results are displayed in a common layout. Thus, a user can concentrate on working out queries and options, the part of most interest to him, and does not need to take trouble in the part related to the running of the game. This makes it easy to propose a game. Moreover, since the software related to the running of the game is shared among game participants, the data that needs to be exchanged among game participants is as little as the ID by which to specify the shared data plus minimal information contents.

If, in step S292, the responses are not in response to a template game, the flow proceeds to step S316, where statistic processing specific to each game is executed.

Figure 17:
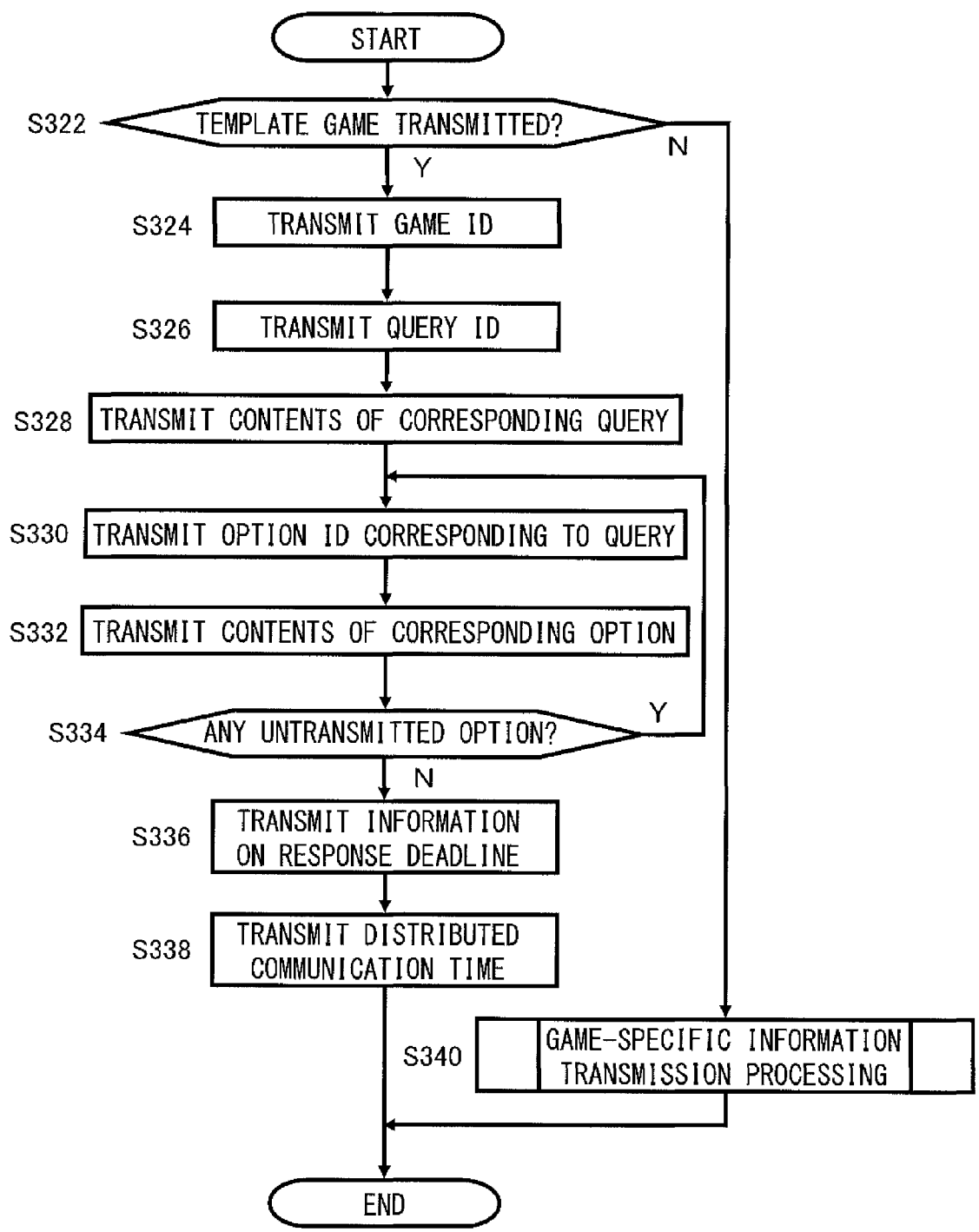
FIG. 17 is a flow chart showing the details of the processing for transmission of initial information to every participant in step S114 in FIGS. 9, 10, and 12.

FIG. 17 is a flow chart showing the details of the transmission of initial information to all participants in step S114 common to FIGS. 9, 10, and 12. When it is confirmed, in step S113, that the flow started via the processing for game proposal shown in FIG. 7 and the step S114 is reached, the flow shown in FIG. 17 starts. In step S322, it is checked whether or not the initial information to be transmitted to participants is related to a template game. If it is related to a template game, then, in step S324, the ID of the game is transmitted. This is because the receivers previously share a plurality of software programs for processing various template games, and simply specifying the game ID makes it possible to process the specified game.

Next, in step S326, the ID assigned to a query to participants is transmitted and then, in step S328, the contents of the query corresponding to that ID are transmitted. Then, in step S330, the ID assigned to one of the options of the response to the query is transmitted and then, in step S332, the contents of the option corresponding to that ID are transmitted. Then, in step S334, it is checked whether or not there remains any still untransmitted option. If there is any untransmitted option, the flow returns to step S330, where the ID of the next option responsive to the query is transmitted. Thereafter, until there remains no untransmitted option, steps S330 through S334 are repeated.

If, in step S334, it is detected that there remains no untransmitted option, the flow proceeds to step S336, where information on the response deadline is transmitted. Then, in step S338, the communication times allocated in step S107 in FIG. 8 are transmitted. The allocated communication times differ among participants, and accordingly either they are transmitted individually to respective participants or an allocation table for all participants is transmitted to them at once.

Thus the flow shown in FIG. 17 ends. If, in step S332, the transmission is detected to be not related to a template game, the flow proceeds directly to step S340, where processing for transmitting information specific to the game is executed, and then the flow ends.

Figure 18:
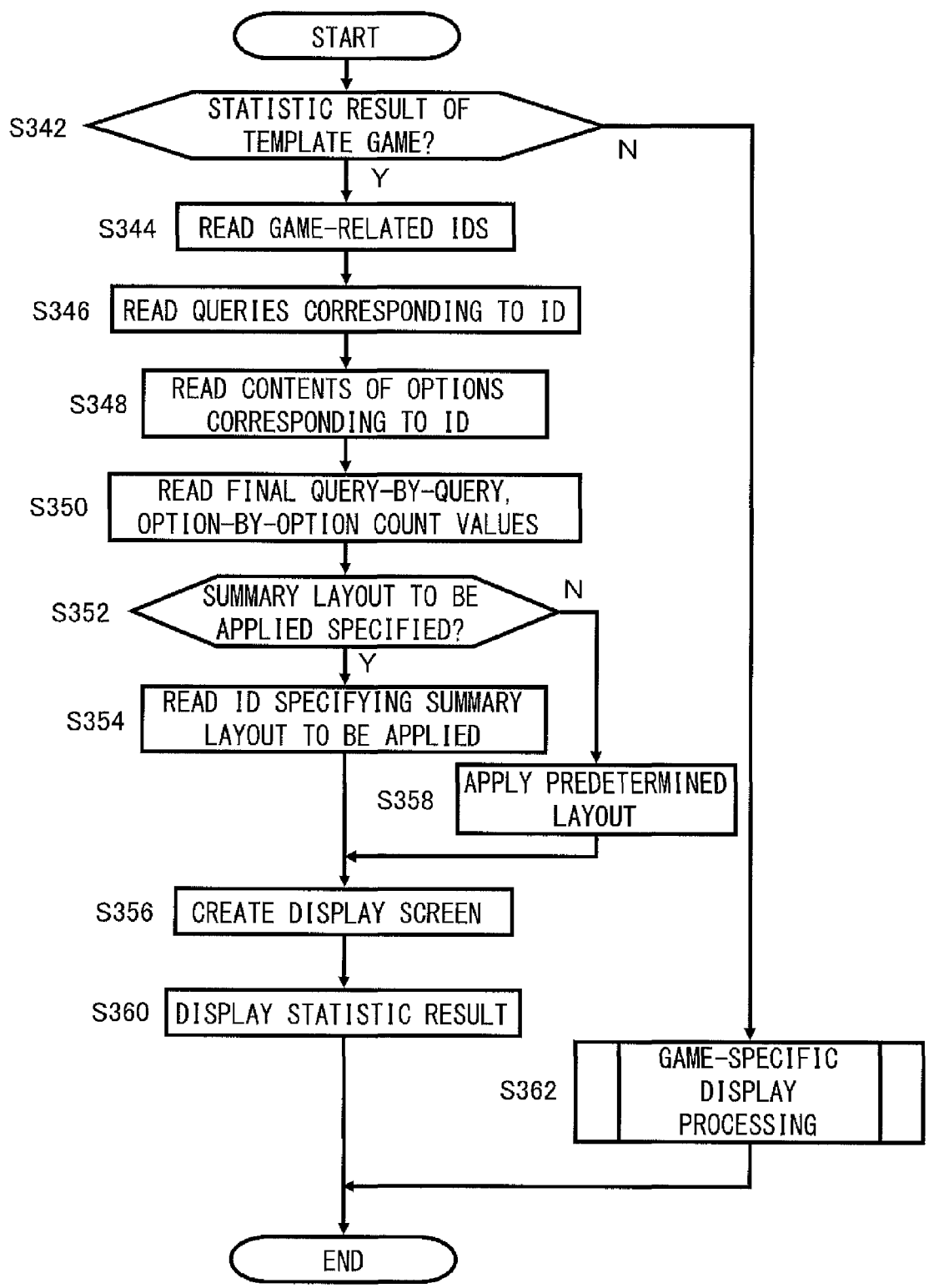
FIG. 18 is a flow chart showing the details of the processing for statistic result display in step S123 and S144 in FIGS. 9, 10, and 12.

FIG. 18 is a flow chart showing the details of the processing for displaying the statistic result on the part of a participant in step S144 common to FIGS. 9, 10, and 13. When the statistic result is detected in step S142 and the step S144 is reached, the flow shown in FIG. 18 starts. In step S342, it is checked whether or not the statistic result of a template game is received.

If the statistic result of a template game is received, in step S344, from the received information, game-related IDs are read out. The game-related IDs contain a game ID, query IDs, option IDs, etc. Next, the flow proceeds to step S346, where the contents of the queries inputted to the query template specified by the IDs read out are read out. The contents of those queries and of their respective options have already been received as initial information in the flow shown in FIG. 17. Then, in step S348, the contents of the options inputted to the option template specified by the IDs read out are read out. Then, in step S350, the final count values accumulated option-by-option are read out.

Next, the thus obtained information for the display of the statistic result is displayed. First, in step S352, it is checked whether or not, in the received information, a layout to be applied to the display of the summary is specified. Specifically, it is checked whether or not the game-related IDs read out in step S344 contain an ID that specifies the summary layout to be applied. If there is an ID that specifies a summary layout, then, in step S354, where the ID is read out, and the flow proceeds to step S356. On the other hand, if, in step S352, no layout is specified, then, in step S358, a predetermined layout is applied, and the flow proceeds to step S356.

Through the above operations, the information contents for statistic display and the information needed to display them are now at hand, and thus, in step S356, based on the information, data of the screen to be displayed is created. Then, in step S360, the statistic result is displayed, and the flow ends.

On the other hand, if, in step S342, the statistic result of a template game is not received, the flow proceeds to step S362, where processing for game-specific display is executed, and the flow ends.

The flow of FIG. 18 has been described as one showing the details of the processing for statistic result display on the part of a participant; a flow chart showing the details of the processing for statistic result display on the part of the proponent in step S123 common to FIGS. 9, 10, and 13 basically has a similar configuration. A difference is that what is checked in step S342 is not a received statistic result but the statistic result that the proponent himself has processed in step S120.

Moreover, the flow of FIG. 18 is used not only to display in-progress reports of statistic processing but also to display the final result in step S130 or S148 common to FIGS. 9, 10, and 13.

Figure 19:
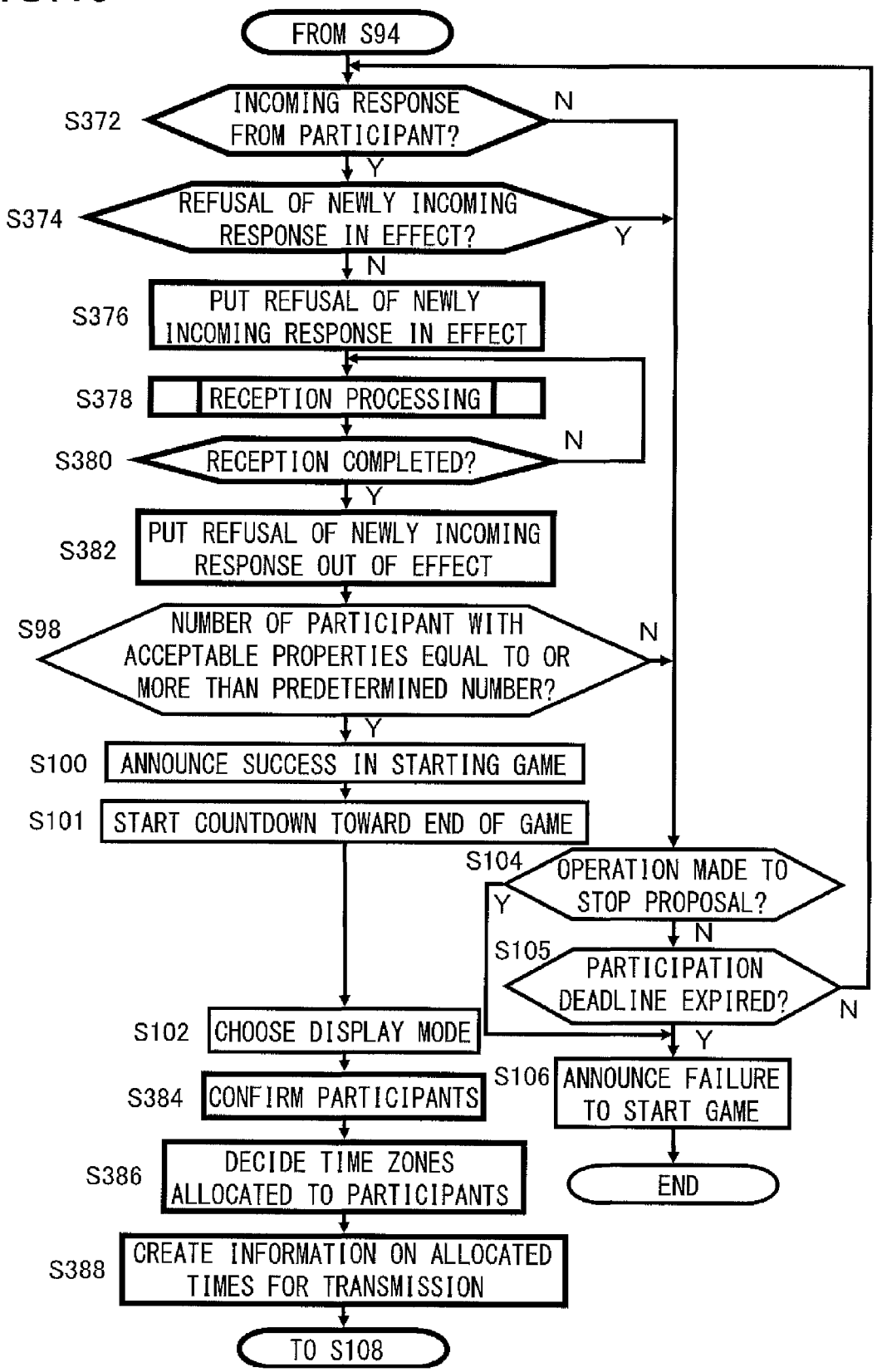
FIG. 19 is a flow chart showing the details of part of the processing in FIGS. 7 and 8.

FIG. 19 is a flow chart showing the details of part of the flows shown in FIGS. 7 and 8; specifically, what it shows is the details of the flow proceeding from step S96 through step S103 in FIG. 7 and thence jumping to FIG. 8, showing the details of that step, until reaching step S107. In FIG. 19, the steps in the part thereof common with FIGS. 7 and 8, that is, the same steps as those found in FIGS. 7 and 8, are identified by common step numbers, and their description will not be repeated. In contrast, such steps in FIG. 19 that differ from those in FIGS. 7 and 8 are indicated by thicker lines and are identified by different step numbers. The following is an in-brief description focused on these steps.

In FIG. 7, when the flow proceeds from step S94 to step S96, it is checked whether or not there are responses from participants. The details of this is shown in steps S372 through S382 in FIG. 19. First, in step S372, it is checked whether or not there is an incoming response from a participant. If there is no incoming response, the flow proceeds to step S104. This corresponds to the operation in step S96, where, if there is no response from participants, the flow proceeds to step S104. Since steps S104 through S106 are the same as in FIG. 7, their description will be omitted.

By contrast, if there is an incoming response, the flow proceeds to step S374, where it is checked whether or not refusal of a newly incoming response is in effect. If refusal of a newly incoming response is in effect, it means that another incoming response is currently being received; thus, the newly incoming response is not received, and the flow proceeds to step S104. In this way, even when there is an incoming response, if another incoming response is already being received, the former is refused on a first-access-first-served basis. On the other hand, if, in step S374, refusal of a newly incoming response is not in effect, it means that no other incoming response is currently being received; thus, to proceed to reception, the flow proceeds to step S376, where refusal of a newly incoming response is put into effect so that no overlap will occur with later reception.

Next, in step S378, processing for reception is executed and, while the process is being executed, the flow proceeds to step S380. In step S380, it is checked whether or not information occurs to the effect that reception has been completed in the reception processing in step S378, and, if reception has not been completed yet, the flow returns to step S378 to continue with the reception processing. When completion of reception is confirmed, the flow proceeds to step S382, where refusal of a newly incoming response is put out of effect so that the next incoming response can be accepted. Every time a response is received in this way, the flow proceeds to step S98. The following steps up through step S102 are the same as in FIG. 7, and therefore their description will be omitted.

From step S102 in FIG. 7, the flow proceeds to the processing for a 100-people game in step S103, the details of which are as shown in FIG. 8. Steps S384 through S388 in FIG. 19 show, in the context of this flow, the details of the processing for allocating communication time in step S107 in FIG. 8.

First, in step S384, participants are confirmed. In this operation, the addresses with which the short-distance communication portions of the cellular phones of individual participants can be identified are confirmed, and the number of participant is confirmed. Based on the information confirmed in step S384, in step S386, the response time zones allocated to participants are decided. Then, based on that, in step S388, information on allocated times is created for transmission, and the flow proceeds to step S108. This information is created either individually as different information for each participant or in the form of an allocation table common to all participants that can be transmitted to all of them.

As described above, between at the stage where an unpredicted number of respondents are solicited as in steps S372 through S382 and at the stage where communication is conducted with identified participants as in steps S384 through S388, it is possible to adopt, as means for preventing overlap between transmission from a plurality of participants, different means suitable for the respective stages. This, however, is in no way meant to limit the invention; depending on the situation and purpose, it is also possible to adopt response overlap prevention measures common to the two stages.

The information on allocated times created for transmission in step S388 is transmitted to each participant in step S338 in FIG. 17.

Hereinafter, conventional problems and the various solutions thereof that the present invention has achieved, which have been described in the embodiments above, will be summarized as follows:

First, with conventional information exchanging apparatuses, because of charges for the use of cellular phone networks, such functions have not yet become common as functions that can be easily used like those, such as games, executed within cellular phones themselves.

In view of the above, an object of the invention is to provide an information exchanging apparatus that permits easier information exchange; another object of the invention is to provide an information exchanging apparatus that permits easy coordination among a comparatively large number of people.

To achieve the above objects, according to one aspect of the invention, an information exchanging apparatus comprises: a first wireless communication means that has a telephone function portion for transmitting and receiving voice and that communicates with an outside communication apparatus; a second wireless communication means separate therefrom; an information transmission portion that performs information transmission to a plurality of outside communication apparatuses by the second wireless communication means; a response processing portion that processes responses received, with respect to the information transmission, from a plurality of outside communication apparatuses by the second wireless communication means; and a distribution portion that distributes a result of processing by the response processing portion to a plurality of outside communication apparatuses by the second wireless communication means. Thus, according to the invention, by wireless communication means that, despite incorporated in an appliance such as a cellular phone having wireless telephone functions, is separate from wireless communication means for telephone functions and does not incur charges, it is possible to perform information transmission to a plurality of partners, to process responses therefrom, and to distribute processing results. Thus, an information exchanging apparatus is provided that is useful in games and public opinion surveys participated in by a large number of people. Moreover, the above feature of the invention, according to which wireless communication means separate from a charge-incurring telephone network is linked with means for making information exchange easy, makes it possible, rather than passively participating in a survey or the like administered by a large-scale server, to act as the proponent of a survey or the like and invite a large number of people.

According to a specific feature of the invention, the information transmission portion transmits a query along with options responsive to it. This helps standardize information transmission and response, thus makes information transmission and response easy, and also makes the necessary processing easy, contributing to generalization of functions.

According to another specific feature of the invention, a response manipulation portion is provided that responds, with respect to information transmission from an outside communication apparatus, by the second wireless communication means. This makes it possible not only to act on the information transmission side oneself but also to respond to information transmission from outside. Thus, it is possible not only to propose information exchange but also to easily participate in information exchange proposed by another. More specifically, the response manipulation portion may be so configured as to select a response option in reply to a query and response options with respect to information transmission from an outside communication apparatus. This makes response easy.

According to another specific feature of the invention, a display portion is shared for the display of information to be transmitted. This makes it possible to easily confirm the information to be exchanged irrespective of whether on the information transmission side or on the response side. Thus, it is possible to exchange information freely from either side.

According to another specific feature of the invention, means for processing information of the information transmission portion is shared with an outside communication apparatus. Sharing the processing means in this way helps standardize the processing. This makes it possible to realize a system that can, irrespective of whether on the information transmission side or on the response side, freely perform a series of operations to perform information transmission to a plurality of partners, to process responses therefrom, and to distribute processing results. Theoretically, exchange of information having similar contents to that exchanged by the invention is eventually possible, for example, through repeated, elaborate communication and transfer by use of the mail functions of cellular phones. In reality, however, doing that is extremely difficult and incurs high communication charges. By contrast, according to the invention, on a shared system, information can be exchanges easily and inexpensively.

According to another specific feature of the invention, a control portion is provided that transmits the processing result by the response processing portion to an external server by the first wireless communication means and that receives a comprehensive processing result obtained by processing that processing result from the external server by the first wireless communication means. The distribution portion distributes the comprehensive processing result received by the control portion to a plurality of outside communication apparatuses by the second wireless communication means. Gathering summary results obtained via the second wireless communication means to an external server across a telephone network in this way makes it possible to exchange information beyond the communication range of the second wireless communication means, and is useful in wide-area surveys etc. Moreover, summarizing and distributing summary results across a telephone network via the second wireless communication means in this way helps promote information exchange in terms of both efficiency and costs, compared with an external server collecting information directly from individual cellular phones across a telephone network. Furthermore, information is first collected in each communication range of the second wireless communication means and then gathered to an external server. This makes it easy to control the method of sampling surveys in terms of how to conduct local on-site surveys in specified areas such as railway stations and parks and how to summarize the local survey results in a wide area. By contrast, in a case where an external server directly accesses individual cellular phones across a telephone network, because cellular phones are constantly moving, centralized control of local sites requires a huge amount of information processing.

According to another aspect of the invention, an information exchanging apparatus comprises: first wireless communication means; second wireless communication means separate therefrom; an information transmission portion that performs information transmission to a plurality of outside communication apparatuses by the second wireless communication means; a control portion that transmits information related to responses received, with respect to the information transmission, from a plurality of outside communication apparatuses by the second wireless communication means to an external server by the first wireless communication means and that receives a processing result obtained by processing that information from the external server by the first wireless communication means; and a distribution portion that distributes the processing result received by the control portion to a plurality of outside communication apparatuses by the second wireless communication means. Application of these features of the invention—information that has been passed via the second wireless communication means is summarized by the first wireless communication means and the summary result from the first wireless communication means is distributed via the second wireless communication means—is not limited to cellular phones. that is, these features help realize an information exchanging apparatus that permits easy control of the method of sampling surveys in terms of how to conduct local on-site surveys in specified areas and how to summarize the local survey results in a wide area, and these features find wide application elsewhere. Incidentally, when information related to responses received by the second wireless communication means is transmitted to an external server by the first wireless communication means as described above, such information does not necessarily have to be processed before transmission; instead, received raw information may be directly transmitted, and many other specific methods of implementation is possible. What is important is that information related to responses received by the second wireless communication means is eventually transmitted to an external server that processes it.

According to a specific feature of the above invention, a reception control portion is provided that receives information to be transmitted by the information transmission portion from an external server by the first wireless communication means. Responses to information transmission are eventually processed by an external server. Thus, this configuration makes it possible to start a series of information exchanges from an external server. This makes it possible to realize an information exchanging apparatus useful in wide-area information exchange as in surveys beyond the communication range of the second wireless communication means.

According to another aspect of the invention, an information exchanging apparatus comprises: first wireless communication means for receiving information to be transmitted to an outside communication apparatus from a wide-area server; second wireless communication means separate therefrom; an information transmission portion that transmits the information received by the first wireless communication means to a plurality of outside communication apparatuses by the second wireless communication means; a response processing portion that processes responses received, with respect to the information transmission, from a plurality of outside communication apparatuses by the second wireless communication means; and a distribution portion that distributes a processing result to a plurality of outside communication apparatuses by the second wireless communication means.

This feature of the invention—information to be transmitted by the information transmission portion is received from an external server by the first wireless communication means—is not limited to cases where information processing is performed by an external server, but is also useful in cases where responses are processed by the information exchanging apparatus itself. Participation in information exchange can be accomplished with an easy operation, because it simply involves responding to information transmission already performed by someone; by contrast, creating information transmission from scratch to solicit responses from others is not easy. In this case, if information transmission can be done by selection of one among several items on an existing menu, or if there is an existing template and one has only to input contents to it, information transmission is extremely easy. The above feature makes it possible to receive such existing information, existing templates, etc. from an external server, and thus contributes to facilitating information transmission.

According to another aspect of the invention, an information exchanging apparatus comprises: first wireless communication means that communicates with an outside communication apparatus; a second wireless communication means separate therefrom; an information transmission portion that performs information transmission to a plurality of outside communication apparatuses by the second wireless communication means; a response processing portion that processes responses received, with respect to the information transmission, from a plurality of outside communication apparatuses by the second wireless communication means; a distribution portion that distributes a processing result to a plurality of outside communication apparatuses by the second wireless communication means; and a reception control portion that receives processing means for processing information of the information transmission portion from an external server by the first wireless communication means. Needs for information exchange are varied. The above features make it easy to receive processing means, such as software executing processing needed to conduct information exchange, from an external server. These features of the above invention—processing means is acquired by the first wireless communication means and the processing by the processing means is executed by the second wireless communication means—permit a single information exchanging apparatus to be provided with two types of wireless communication means and permit it to use them separately for the acquisition of processing means and for the execution of its processing. This contributes to making information exchange versatile and easy.

Second, in conventional information exchanging apparatuses, information exchange functions have not yet become common as functions that can be easily used like those, such as games, executed within cellular phones themselves.

In view of the above, an object of the invention is to provide an information exchanging apparatus that permits easier information exchange; another object of the invention is to provide an information exchanging apparatus that permits, in particular, easy information transmission.

To achieve the above objects, according to one aspect of the invention, an information exchanging apparatus comprises: communicating means that communicates with an outside communication apparatus; an information transmission portion that transmits, to an outside communication apparatus by the communicating means, a plurality of information identification signals and information contents assigned respectively to those information identification signals; a response processing portion that processes information identification signals received, in response to the information transmission, from an outside communication apparatus by the communicating means; and a distribution portion that distributes a result of processing of information identification signals by the response processing portion to an outside communication apparatus by the communicating means.

With the above configuration, information contents are dealt with in a form assigned to information identification signals, and this makes it possible to perform information transmission, to respond to them, and to process responses based on the information identification signals. Thus, simply assigning information contents to information identification signals makes it possible to deal with information in a standardized fashion irrespective of information contents.

Participation in information exchange can be accomplished with an easy operation, because it simply involves responding to information transmission already performed by someone; by contrast, preparing information transmission from scratch to solicit responses from others is not easy. In this case, with a configuration as described above where a framework for dealing with information is previously prepared and what is additionally required is simply to assign information contents to it, it is extremely easy to perform information transmission.

According to a specific feature of the invention, the information transmission portion transmits an identification signal of a query, query contents information assigned to it, identification signals of a plurality of options as responses to the query, and a plurality of sets of option contents information assigned respectively to them. This makes it possible to conduct information exchange easily in a versatile form of a query accompanied with a plurality of response options.

According to another specific feature of the invention, an information transmission manipulation portion is provided that permits alteration of the information contents assigned respectively to a plurality of information identification signals. This makes it possible to assign desired information contents to information identification signals.

According to another specific feature of the invention, a response manipulation portion is provided that responds to a plurality of information identification signals and the information contents assigned respectively to them received from an outside communication apparatus by the communicating means and that transmits information identification signals by the communicating means.

According to a more specific feature of the invention, the response manipulation portion responds to an identification signal of a query, query contents information assigned to it, identification signals of a plurality of options as responses to the query, and a plurality of sets of option contents information assigned respectively to them received from outside by the communicating means, and selects the identification signal of an option by the communicating means.

With a configuration as described above where it is possible not only to perform information transmission but also to respond to received information, it is possible to conduct information exchange freely with an outside communication apparatus.

According to another specific feature of the invention, a display portion is provided that displays a processing result received from an outside communication apparatus by the communicating means. According to a more specific feature of the invention, the display portion can also display information of the information transmission portion. This makes information transmission easier.

According to another specific feature of the invention, processing means for processing information of the information transmission portion is shared with an outside communication apparatus. This helps standardize the part dealing with information unrelated to information contents, and makes information exchange smooth; it also helps limit information to be exchanged to specific, unshared information, and makes information exchange easy.

According to another aspect of the invention, an information exchanging apparatus comprises: communicating means that communicates with an outside communication apparatus; an information reception portion that receives, from an outside communication apparatus by the communicating means, a plurality of information identification signals and information contents assigned respectively to those information identification signals; a response manipulation portion that transmits, as responses to received information, information identification signals by the communicating means; a display portion that receives, from an outside communication apparatus by the communicating means, and displays a result of processing of information identification signals transmitted as responses; a controlling portion that, on the occasion of display, provides the display portion with, as display information, information contents assigned respectively to information identification signals received by the information reception portion.

With this configuration, when a response to received information is transmitted and the result of its processing is received and displayed, the information contents received before the transmission of the response are used in the display of the processing result. Thus, even when transmission and reception of a response and a processing result are performed by means of information identification signals, it is possible to display the processing result with sufficient information contents.

According to a specific feature of the above invention, the information reception portion receives an identification signal of a query, query contents information assigned to it, identification signals of a plurality of options as responses to the query, and a plurality of sets of option contents information assigned respectively to them. According to a more specific feature, the response manipulation portion responds to a plurality of information identification signals and the information contents assigned respectively to them received by the information reception portion, and selects an information identification signal. According to another specific feature, the display portion can display information received by the information reception portion.

According to another aspect of the invention, an information exchanging apparatus comprises: communicating means that communicates with an outside communication apparatus; an information transmission portion that transmits, to an outside communication apparatus by the communicating means, an identification signal of information shared with the outside communication apparatus and information the outside communication apparatus does not have; and an information transmission manipulation portion that alters information an outside communication apparatus does not have.

With this configuration, part of information exchange can be conducted on the basis of shared information, and unshared information is altered by the information transmission manipulation portion. This makes information transmission easy.

According to another aspect of the invention, an information exchanging apparatus comprises: communicating means that communicates with an outside communication apparatus; an information transmission portion that transmits, to an outside communication apparatus by the communicating means, general information common to other information and specific information associated with the general information; an information transmission manipulation portion that alters specific information associated with general information; and a display portion that displays information transmitted by the information transmission portion.

With this configuration, part of information exchange can be conducted on the basis of general information common to other information, and specific information associated with such general information is altered by the information transmission manipulation portion. This makes information transmission easy.

According to a specific feature of the above invention, an information reception portion is provided that receives, by the communicating means, general information common to other information and specific information assigned to that general information, and the display portion displays information received by the information reception portion. With this configuration, with which it is possible not only to perform information transmission but also to deal with received information, it is possible to conduct information exchange freely with an outside communication apparatus.

Third, with conventional information exchanging apparatuses, information exchange needs to be performed under conditions unified among partners, and has not yet become common as functions that can be easily used like those, such as games, executed on cellular phones themselves.

In view of the above, an object of the invention is to provide an information exchanging apparatus that permits easier information exchange; another object of the invention is to provide an information exchanging apparatus that permits easy unification of conditions for information exchange between partners.

To achieve the above objects, according to one aspect of the invention, an information exchanging apparatus comprises: a first wireless communication means that has a telephone function portion for transmitting and receiving voice and that communicates with an outside communication apparatus; a second wireless communication means separate therefrom; an information exchange portion that conducts information exchange with an outside communication apparatus by the second wireless communication means; a holding portion that holds control information needed in information exchange with an outside communication apparatus; and a control information transfer control portion that transmits the control information to an outside communication apparatus by the second wireless communication means.

With the above configuration, even when an outside communication apparatus serving as a partner of information exchange has not downloaded, for example by the first wireless communication means related to telephone functions, control information needed in information exchange, the control information one has can be easily exported by the second wireless communication means.

According to a specific feature of the invention, the control information transfer control portion can receive, by the second wireless communication means, control information needed in information exchange with an outside communication apparatus and hold it in the holding portion. This makes it easy to import, to one's own holding portion, control information that an outside communication apparatus has. Thus it is possible to share control information bidirectionally.

According to another specific feature of the invention, the control information transfer control portion is started in association with a predetermined operation on the information exchanging apparatus. For example, in a case where displaying means for displaying control information held in the holding portion is provided, in association with an operation to display control information by the displaying means, the control information transfer control portion is started. Thus, without a special operation to share control information, the function for sharing control information is started.

According to another specific feature of the invention, the holding portion holds an information identification signal that identifies held control information, and the control information transfer control portion transmits the information identification signal by second communication means and thereby transfers the control information held by the holding portion to an outside communication apparatus. According to a more specific feature of the invention, the control information transfer control portion can also receive an identification signal that identifies control information by second communication means and thereby confirm the control information an outside communication apparatus has. With these features, it is possible to easily confirm control information each other has. According to a more specific feature of the invention, in a case where displaying means is provided that displays control information the holding portion holds, the control information transfer control portion receives or transmits an identification signal in association with an operation for displaying control information. This makes it possible to confirm control information each other has without a special operation.

According to a more specific feature of the above, the control information transfer control portion, when it recognizes that no control information corresponding to a received identification signal is held in the holding portion, receives the corresponding control information from an outside communication apparatus by the second communication means and makes the holding portion hold it. This makes it possible to make up missing control information easily.

In the foregoing, control information needed in information exchange with an outside communication apparatus includes control information that can be shared among a plurality of types of information exchange, control information dedicated to particular information exchange, information format information used in information exchange, improvement information of any already mentioned, etc., and the holding portion holds at least one of these kinds of information.

According to another specific feature of the invention, the control information transfer control portion can also receive, by the first wireless communication means, control information needed in information exchange with an outside communication apparatus by the information exchange portion and make the holding portion hold it.

Specifically, the control information transfer control portion receives, by the first wireless communication means, control information that cannot be received by the second wireless communication means, and makes the holding portion hold it. Moreover, the control information transfer control portion receives, by the first wireless communication means, control information an outside communication apparatus does not hold, and makes the holding portion hold it. Furthermore, the control information transfer control portion, after receiving control information receivable by the second wireless communication means, receives control information by the first wireless communication means. In this way, through appropriate use of the first and second wireless communication means, whenever any information exchanging apparatus acquires control information by the first wireless communication means, it can be easily circulated to another information exchanging apparatus by the second wireless communication means.

According to another aspect of the invention, an information exchanging apparatus comprises: first wireless communication means that has a telephone function portion for transmission and reception of voice and that communicates with an outside communication apparatus; second wireless communication means separate therefrom; an information exchange portion that conducts information exchange with an outside communication apparatus by the second wireless communication means; a control information transfer control portion that receives, by the second wireless communication means, control information needed in information exchange with an outside communication apparatus by the information exchange portion; and a holding portion that holds control information received by the control information transfer control portion.

With the above configuration, even when control information needed in information exchange has not been downloaded, for example, by the first wireless communication means related to telephone functions, control information that an outside communication apparatus has already acquired can be easily imported to one's own holding portion by the second wireless communication means.

According to another aspect of the invention, an information exchanging apparatus comprises: wireless communication means that communicates with an outside communication apparatus; an information exchange portion that conducts information exchange with an outside communication apparatus by the wireless communication means; a holding portion that holds control information needed in information exchange with an outside communication apparatus and an information identification signal that identifies the control information; and a control information transfer control portion that transmits, by the wireless communication means, the identification signal held by the holding portion to an outside communication apparatus.

With the above configuration, control information that one has can be easily transferred to an outside communication apparatus. According to a more specific feature, in response to transmission of such an information identification signal, the control information transfer control portion transmits, to an outside communication apparatus by the wireless communication means, control information corresponding to the identification signal specified from the outside communication apparatus via the wireless communication means. This makes it possible to transmit, first, all identification information that may be needed by an outside communication apparatus and then transmit, out of that information, only the control information corresponding to the identification signal specified by the outside communication apparatus to the outside communication apparatus by the wireless communication means. This makes it possible to share control signals efficiently.

According to another aspect of the invention, an information exchanging apparatus comprises: wireless communication means that communicates with an outside communication apparatus; an information exchange portion that conducts information exchange with an outside communication apparatus by the wireless communication means; a holding portion that holds control information needed in information exchange with an outside communication apparatus; and a control information transfer control portion that receives, from an outside communication apparatus by the wireless communication means, an information identification signal that identifies control information.

With the above configuration, control information held by an outside communication apparatus can be easily confirmed. According to a more specific feature, the control information transfer control portion selects, from identification signals received from an outside communication apparatus by the wireless communication means, a desired one and transmits it to the outside communication apparatus by the wireless communication means. This makes it possible to select desired control information and to request its transmission from an outside communication apparatus.

According to a more specific feature, the control information transfer control portion can, as specified by an identification signal, receive control information corresponding to it from an outside communication apparatus and make the holding portion hold it. This helps realize efficient acquisition of control information.

According to another aspect of the invention, an information exchanging apparatus comprises: wireless communication means that communicates with an outside communication apparatus in connection with transmission of control information; an information exchange portion that conducts information exchange with an outside communication apparatus by the wireless communication means; a holding portion that holds control information needed in information exchange with an outside communication apparatus; and a control information transfer control portion that transmits, in connection with a predetermined operation, information related to held control information to an outside communication apparatus by the wireless communication means.

On the other hand, according to another aspect of the invention, an information exchanging apparatus comprises: wireless communication means that communicates with an outside communication apparatus in connection with reception of control information; an information exchange portion that conducts information exchange with an outside communication apparatus by the wireless communication means; a control information transfer control portion that receives, in connection with a predetermined operation, control information needed in information exchange with an outside communication apparatus; and a holding portion that holds the received control information.

With either of the above, without a special operation to share control information, the function for sharing control information is started. According to the above specific feature, in a case where displaying means is provided that displays control information held in the holding portion, the control information transfer control portion operates in association with an operation to display control information by the displaying means. Thus, the function for sharing control information is started naturally to accompany the operation to confirm control information by the displaying means.

Fourth, in conventional information exchanging apparatuses, information exchange absolutely needs a partner, and this inevitably complicates the conditions for using relevant functions. Thus, such functions have not yet become common as functions that can be easily used like those, such as games, executed on cellular phones themselves.

In view of the above, an object of the invention is to provide an information exchanging apparatus that a user can use easily without confusion.

To achieve the above object, according to one aspect of the invention, an information exchanging apparatus comprises: an information exchange function portion that conducts information exchange with an outside communication apparatus by wireless communication means that communicates with the outside communication apparatus; an internal function portion; a function selection manipulation portion that chooses between a function of the information exchange function portion and a function of the internal function portion; judging means that judges whether or not a condition for making the information exchange function portion function is fulfilled; and a control portion that, when the judging means cannot find that the condition is fulfilled, disables selection of the information exchange function portion by the function selection manipulation portion.

This helps prevent the user becoming confused as a result of selecting the information exchange function portion by the function selection portion when no condition permitting the functioning of the information exchange function portion is fulfilled. Specifically, even a user having no knowledge of a condition for accomplishing an information exchange function can use the information exchanging apparatus, and it is possible to prevent the user from recognizing, when he has chosen an information exchange function but it does not function, the failure as a fault.

According to a specific feature of the invention, the judging means has confirming means that confirms presence of an outside communication apparatus with which communication is possible by the wireless communication means, and, when the confirming means cannot confirm presence of an outside communication apparatus, selection of the information exchange function portion by the function selection manipulation portion is disabled. This helps prevent an unreasonable operation of choosing the function of the information exchange portion despite absence of a communicable outside communication apparatus.

According to another specific feature of the invention, the judging means has grasping means that grasps the number of outside communication apparatuses with which communication is possible by the wireless communication means, and, when the grasping means cannot grasp a number of communicable outside communication apparatuses equal to or greater than a predetermined number, selection of the information exchange function portion by the function selection manipulation portion is disabled. This helps prevent an unreasonable operation of choosing, when the number of outside communication apparatuses present is less than the predetermined number, an information exchange function that cannot be accomplished when that condition is not fulfilled.

According to another specific feature of the invention, the judging means has evaluating means that evaluates whether or not the number of outside communication apparatuses with which communication is possible by the wireless communication means is stable, and, when the evaluating means cannot recognize, that the number of communicable outside communication apparatuses is stable, selection of the information exchange function portion by the function selection manipulation portion is disabled. This helps prevent an unreasonable operation of choosing, when the number of communicable outside communication apparatuses is stable, an information exchange function that cannot be accomplished when that condition is not fulfilled.

According to another specific feature of the above invention, the function selection manipulation portion has a display portion that displays selectable functions, and control is performed such that, when the judging means cannot recognize fulfillment of the condition, no display related to a function of the information exchange function portion is made on the display. This helps prevent unreasonable selection.

According to yet another specific feature of the invention, when the internal function portion is functioning, if the judging means recognizes that the condition permitting the functioning of the information exchange function portion is fulfilled, the control portion enables selection of the information exchange function portion by the function selection manipulation portion. This helps minimize the restriction on selection.

According to another aspect of the invention, an information exchanging apparatus comprises: wireless communication means that communicates with an outside communication apparatus; an information exchange function portion that conducts information exchange with an outside communication apparatus by the wireless communication means; an information reception portion that receives information related to an information exchange function from an outside communication apparatus by the wireless communication means; and a display portion that displays a function possible by the function selection portion based on information received by the information reception portion. This makes it possible to grasp information related to the information exchange function portion outside.

According to another specific feature of the above invention, the display portion displays an information exchange function currently being executed by an outside communication apparatus based on information received by the information reception portion. This makes it possible to grasp how information exchange is currently being conducted outside and to participate in it.

According to another specific feature of the invention, judging means is provided that judges whether or not a condition permitting the functioning of the information exchange function portion is fulfilled, and the display portion, based on information from the judging means, displays a function possible by the information exchange function portion distinguishably from an information exchange function currently being executed. This makes it possible to distinguish whether or not an information exchange function is possible and whether or not information exchange is actually being conducted outside by use of that function; thus, for example, based on the former it is possible to propose information exchange to outside and, based on the latter, it is possible to participate in information exchange currently being conducted.

According to yet another specific feature of the invention, the display portion displays, based on information received by the information reception portion, information related to an information exchange function currently being conducted, such as information related to a condition that permits the use of the information exchange function and information related to the number of outside communication apparatuses using the information exchange function. Such information can be consulted in deciding whether or not to participate in information exchange currently being conducted.

According to another aspect of the invention, an information exchanging apparatus comprises: wireless communication means that communicates with an outside communication apparatus; an information exchange function portion that conducts information exchange with an outside communication apparatus by the wireless communication means; an information exchange proposal portion that, by the wireless communication means, transmits information exchange to an outside communication apparatus and receives a response to it; and a notification portion that, based on the response received by the information exchange proposal portion, notifies the outside communication apparatus that has responded of a start of information exchange by the wireless communication means. This makes it possible to propose information exchange to outside and start it.

According to another aspect of the invention, an information exchanging apparatus comprises: wireless communication means that communicates with an outside communication apparatus; an information exchange function portion that conducts information exchange with an outside communication apparatus by the wireless communication means; a function selection manipulation portion that chooses between an existing information exchange function and an information exchange function that requires new information; and an input manipulation portion that permits input of information required by the information exchange function that requires new information. This makes versatile information exchange possible, permitting easy information exchange by use of an existing information exchange function, and in addition permitting, if so desired, information exchange based on free input of information.

According to a specific feature of the invention, the information exchanging apparatus configured as described above further has: a telephone function portion for transmitting and receiving voice; and wireless telephone communication means that is separate from the wireless communication means that communicates with an outside communication apparatus based on the telephone function portion. This permits an information exchanging apparatus according to the invention to be used as an ordinary cellular phone, and makes it possible to conduct various kinds of information exchange as mentioned above.

According to a specific feature of the above invention, the information exchange function portion can communicate with an outside communication apparatus also by the wireless telephone communication means, and has a function selection manipulation portion that chooses between an information exchange function by the wireless communication means alone and an information exchange function by use of both the wireless communication means and the wireless telephone communication means. This makes versatile information exchange possible.

According to another aspect of the invention, an information exchanging apparatus comprises: wireless communication means that communicates with an outside communication apparatus; an information exchange function portion that conducts information exchange with an outside communication apparatus by the wireless communication means; a function selection manipulation portion that chooses between an information exchange function that involves simple observation of progress of information exchange and an information exchange function that involves participation in progress of information exchange; and a display portion that displays the progress of information exchange. This makes it possible to participate in versatile information exchange.

According to a specific feature of the above invention, depending on the selection by the function selection manipulation portion, the display portion displays the progress of information exchange differently. This makes it possible to display the progress of information exchange suitably in the case of observation alone and also suitably in the case of participation. For example, in the case of participation, one's own action affects the progress; thus, by intentionally delaying the display of the progress, it is possible to increase the pleasure of information exchange.

According to another specific feature of the above invention, a control portion is provided that disables selection by the function selection manipulation portion according to the progress of information exchange. This helps prevent confusion as by prohibiting new participation once information exchange has progressed to a certain degree.

Fifth, in conventional information exchanging apparatuses, compared with functions, such as games, that can be executed on cellular phones themselves, information exchange with a partner involves complicated information, and there has been room for various improvements in terms of display.

In view of the above, an object of the invention is to provide an information exchanging apparatus that enhances the significance of information exchange with well-designed display.

To achieve the above object, according to one aspect of the invention, an information exchanging apparatus comprises: wireless communication means that communicates with an outside communication apparatus; an information exchange function portion that conducts information exchange with an outside communication apparatus by the wireless communication means; a display portion that present display based on information exchange; and a display control portion that makes the display on the display portion different depending on whether or not information collection by the information exchange function portion has been completed or not. This makes it possible to present, in the middle of information exchange, display different from the display of a result of information exchange, and helps increase the pleasure of a game or the like in which in-progress reports can be enjoyed.

According to a specific feature of the invention, until information collection by the information exchange function portion is completed, a restriction is placed on display of information. More specifically, until information collection is completed, the display of information by the display portion is delayed. Alternatively, the display of information by the display portion is executed conditionally; for example, until information collection is completed, no display is presented unless a predetermined condition is fulfilled as when a turning point of a game is reached. By intentionally restricting the information of in-progress results in this way, it is possible to increase the pleasure of guessing others' trend when one is participating in a game or the like involving a large number of people.

According to another aspect of the invention, an information exchanging apparatus comprises: wireless communication means that communicates with an outside communication apparatus; an information exchange function portion that conducts information exchange with an outside communication apparatus by the wireless communication means; a display portion that presents display based on information exchange; a display control portion that controls display; and a selection manipulation portion that chooses whether or not to make the display control portion restrict display of information. This makes it possible to restrict display of information as desired, and makes it possible to adapt information exchange in a game or the like accordingly.

According to a specific feature of the above invention, when the selection manipulation portion chooses to restrict display of information, the display control portion delays display of information. According to another specific feature, when the selection manipulation portion chooses to restrict display of information, the display control portion puts a condition on display of information.

According to another aspect of the invention, an information exchanging apparatus comprises: wireless communication means that communicates with an outside communication apparatus; an information exchange function portion that conducts information exchange with an outside communication apparatus by the wireless communication means; a display portion that presents display based on information exchange; a selection manipulation portion that chooses whether to offer information or simply receive a result of information exchange in information exchange by the information exchange function portion; and a display control portion that makes the display on the display portion different based on the choice by the selection manipulation portion.

For example, when the selection manipulation portion chooses to offer information, it becomes possible to make a setting to delay the display of information by the display portion. Alternatively, when the selection manipulation portion chooses to offer information, it becomes possible to make a setting to put a condition on display of information. With these features, for example in a case where one participates in a game, if he chooses to offer information to participate in its progress, a restriction can be placed on display to increase the pleasure of, for example, guessing others' trend; if he chooses to simply receive results of information exchange in participating the game, he can observe its progress on a real-time basis. In this way, it is possible to make various settings in terms of display.

According to another aspect of the invention, an information exchanging apparatus comprises: wireless communication means that communicates with an outside communication apparatus; an information exchange function portion that conducts information exchange with an outside communication apparatus by the wireless communication means; a display portion that presents display based on information exchange; and a display control portion that varies a relationship between execution of information exchange by the information exchange function portion and execution of information display by the display portion.

According to a specific feature of the above invention, after information exchange by the information exchange function portion is executed, the display control portion delays execution of information display by the display portion. According to another specific feature of the above invention, even when information exchange by the information exchange function portion is executed, unless a predetermined condition is fulfilled, the display control portion suspends execution of information display by the display portion. In this way, by varying the relationship between execution of information exchange by the information exchange function portion and execution of information display by the display portion, it is possible to increase the pleasure of information exchange.

According to another aspect of the invention, an information exchanging apparatus comprises: wireless communication means that communicates with a plurality of outside communication apparatuses; an information exchange function portion that conducts information exchange with an outside communication apparatus by the wireless communication means; and a wireless communication control portion that varies the manner in which information exchange is conducted with the plurality of outside communication apparatuses depending on whether, in information exchange, the plurality of outside communication apparatuses are unidentified or identified.

For example, the wireless communication control portion so controls that, when the plurality of outside communication apparatuses are unidentified, the information exchange function portion conducts information exchange on a first-access-first-served basis and, when the plurality of outside communication apparatuses are identified, the information exchange function portion conducts information exchange in predetermined allocated time zones. For example in this way, by varying the manner in which information exchange is conducted with the plurality of outside communication apparatuses depending on whether, in information exchange, the plurality of outside communication apparatuses are unidentified or identified, it is possible to conduct optimal information exchange with a plurality of outside communication apparatuses in a manner that suits the situation.

According to a specific feature of the invention, the information exchanging apparatus configured as described above further has: a telephone function portion for transmitting and receiving voice; and wireless telephone communication means that is separate from the wireless communication means that communicates with an outside communication apparatus based on the telephone function portion. This permits an information exchanging apparatus according to the invention to be used as an ordinary cellular phone, and makes it possible to conduct various kinds of information exchange as mentioned above.

In the embodiments described above, the invention has been described to be an apparatus that offers a GUI realized by a display portion and a manipulation portion and that can attempt to collect response information through easy transmission of information achieved by input of queries and options to templates displayed on the display portion. Moreover, when distributing results of processing of collected response information to respondents, it is possible to use, as layouts for displaying processing results, existing ones such as graphs.

This, however, is in no way meant to limit how the invention is implemented. For example, information identification signals are not limited to IDs that specify existing templates and existing display layouts as in the embodiments; instead, it is possible to adopt any of various information identification signals to which information contents can be assigned. Although the embodiments describe, as an example of information shared with an outside communication apparatus and as general information common to other information, previously prepared templates and display layouts, this is in no way meant to limit how the invention is implemented. The invention can be implemented with any of various combinations between information shared with an outside apparatus and information an outside apparatus does not have, or with any of various kinds of association of specific information with general information.

While the present invention has been described with respect to preferred embodiments, it will be apparent to those skilled hi the art that the disclosed invention may be modified in numerous ways and may assume many embodiments other than those specifically set out and described above. Accordingly, it is intended by the appended claims to cover all modifications of the present invention which fall within the true spirit and scope of the invention.

What is claimed is:

1. An information exchanging apparatus comprising:
a wireless communicator that communicates with an outside information exchanging apparatus;
an information exchange portion that exchanges information with the outside information exchanging apparatus by the wireless communicator;
a holding portion that holds data of software for executing the information exchange with the outside information exchanging apparatus by the information exchange portion;
a manipulation operation portion capable of a first predetermined manipulation operation for the information exchange by the information exchange portion and a second predetermined manipulation operation other than for the information exchange by the information exchange portion; and
a software transfer control portion that transmits, by the wireless communicator, information related to the data of software held by the holding portion to the outside information exchanging apparatus in association with the second predetermined manipulation operation other than for information exchange.

2. The information exchanging apparatus according to claim 1 wherein the wireless communicator includes:
a first wireless communicator that has a telephone function portion for transmitting and receiving voice and that communicates with an outside information exchanging apparatus, and
a second wireless communicator other than the first wireless communicator,
wherein the information exchange portion exchanges information with the outside information exchanging apparatus by the second wireless communicator, and
wherein the software transfer control portion transmits the data of software held by the holding portion to the outside information exchanging apparatus by the second wireless communicator.

3. The information exchanging apparatus according to claim 1, wherein the software transfer control portion receives, by the second wireless communicator, data of software for executing the information exchange with the outside information exchanging apparatus by the information exchange portion and makes the holding portion hold the received data of software.

4. The information exchanging apparatus according to claim 1 or 3, wherein the holding portion holds a software identification signal that identifies the data of software held thereby, and the software transfer control portion transfers the data of software held by the holding portion to the outside information exchanging apparatus by transmitting the software identification signal by the second wireless communicator.

5. The information exchanging apparatus according to claim 1 wherein the holding portion is arranged to further hold a software identification signal that identifies the data of software, and wherein the software transfer control portion transmits the software identification signal held by the holding portion to the outside information exchanging apparatus by the wireless communicator for the purpose of software transfer.

6. The information exchanging apparatus according to claim 1, wherein the predetermined manipulation operation is to end the information exchange.

7. The information exchanging apparatus according to claim 1 further comprising a display, wherein the predetermined manipulation operation is to control the display.

8. An information exchanging apparatus comprising:
a wireless communicator that communicates with an outside information exchanging apparatus;
an information exchange portion that exchanges information with the outside information exchanging apparatus by the wireless communicator;
a manipulation operation portion capable of a first predetermined manipulation operation for the information exchange by the information exchange portion and a second predetermined manipulation operation other than for the information exchange by the information exchange portion;
a software transfer control portion that receives, by the wireless communicator, data of software for executing the information exchange with the outside information exchanging apparatus by the information exchange portion from the outside information exchanging apparatus in association with the second predetermined manipulation operation other than for information exchange; and a holding portion that holds the received data of software in association with the second predetermined manipulation operation other than for information exchange.

9. The information exchanging apparatus according to claim 8 wherein the a first wireless communicator that has a telephone function portion for transmitting and receiving voice and that communicates with an outside information exchanging apparatus, and a second wireless communicator other than the first wireless communicator, wherein the information exchange portion that exchanges information with the outside information exchanging apparatus by the second wireless communicator and wherein the software transfer control portion receives the data of software by the second wireless communicator.

10. The information exchanging apparatus according to claim 8 wherein the software transfer control portion receives, by the wireless communicator, a software identification signal that identifies the data of software of the outside information exchanging apparatus for the purpose of software transfer.

11. The information exchanging apparatus according to claim 8, wherein the predetermined manipulation operation is to end the information exchange.

12. The information exchanging apparatus according to claim 8 further comprising a display, wherein the predetermined manipulation operation is to control the display.

* * * * *